(12) United States Patent
Matsumura et al.

(10) Patent No.: US 7,013,746 B2
(45) Date of Patent: Mar. 21, 2006

(54) CONTROL METHOD AND CONTROL APPARATUS OF AUTOMATIC TRANSMISSION

(75) Inventors: Tetsuo Matsumura, Chiyoda-ku (JP); Takashi Okada, Chiyoda-ku (JP); Hiroshi Sakamoto, Chiyoda-ku (JP); Sunao Ishihara, Saitama (JP); Isamu Sunaga, Saitama (JP); Toshiharu Kumagai, Saitama (JP)

(73) Assignee: Hitachi, Ltd., Tokyo (JP)

( * ) Notice: Subject to any disclaimer, the term of this patent is extended or adjusted under 35 U.S.C. 154(b) by 108 days.

(21) Appl. No.: 10/780,645

(22) Filed: Feb. 19, 2004

(65) Prior Publication Data

US 2004/0192503 A1 Sep. 30, 2004

(30) Foreign Application Priority Data

Mar. 28, 2003 (JP) ............................. 2003-089827

(51) Int. Cl.
*F16H 59/00* (2006.01)
*B60K 41/04* (2006.01)

(52) U.S. Cl. ......................................... 74/335; 477/34
(58) Field of Classification Search ................. 74/335, 74/336 R, 329; 477/34, 70
See application file for complete search history.

(56) References Cited

U.S. PATENT DOCUMENTS

| | | | |
|---|---|---|---|
| 6,024,672 A * | 2/2000 | Chung | 477/140 |
| 6,520,039 B1 * | 2/2003 | Ogami et al. | 74/335 |
| 2003/0084738 A1 * | 5/2003 | Ishihara et al. | 74/329 |

FOREIGN PATENT DOCUMENTS

| | | | |
|---|---|---|---|
| DE | 19908602 | | 9/2000 |
| DE | 19908602 A1 | * | 9/2000 |
| DE | 10043420 | | 4/2001 |
| DE | 10043420 A1 | * | 4/2001 |
| DE | 19952535 | | 5/2001 |
| DE | 19952535 A1 | * | 5/2001 |
| JP | 2703169 | | 8/1993 |

* cited by examiner

*Primary Examiner*—Roger Pang
(74) *Attorney, Agent, or Firm*—Crowell & Moring LLP

(57) ABSTRACT

When shifting the gear position into a target gear position from a current gear position, some gear position different from said current gear position is used as one distributing gear position. The control unit controls the pressing load of a synchromesh of one distributing gear position to make at least part of the rotation torque from the drive power source transfer by the friction. Thereby it makes at least part of the rotation torque transferred by a synchromesh of the current gear position decrease. And then it moves the synchromesh of said current gear position to a disengaging position not meshed with said idle gear. Thereafter another gear position different from said target gear position and said one distributing gear position is used as another distributing gear position. So that it controls the pressing load of the synchromesh of another distributing gear to make the transfer torque increase gradually by the friction, and simultaneously makes the pressing load of the synchromesh of one distributing gear position decrease gradually. Besides such a distribution of transfer torque, it makes the speed of said input shaft synchronize with the speed corresponding to said target gear position by controlling the speed of said input shaft, and then moves the synchromesh of the target gear position to the meshing position.

13 Claims, 19 Drawing Sheets

CONTROL METHOD AND CONTROL APPARATUS OF AUTOMATIC TRANSMISSION

FIELD OF THE INVENTION

The present invention relates to a control method and a control apparatus of an automatic transmission, and more particularly to a control method and a control apparatus suitable for controlling a synchromesh type automatic transmission used for a car.

PRIOR ART

In recent years, an automatic manual transmission (hereinafter, referred to as an "automatic MT"), which is a system automating a clutch and a gear change machinery by applying a synchromesh type transmission used for a manual transmission, has been developed. However, since the conventional automatic MT makes interruption of the drive torque occur by the clutch disengaging and engaging operation under control at the time of shifting, the driver or the like may be given a feeling of wrongness.

Therefore, for example, as described in U.S. Pat. No. 2,703,169, a friction type assist clutch is installed in a automatic MT, and the drive torque is transferred by the assist clutch during shifting. In the automatic MT, when shifting is started, the input torque to the transmission is transferred by the assist clutch, thus the torque transferred by the gear before shifting is released and the gear is disengaged. At the point of time when the drive torque is transferred by the assist clutch, and simultaneously the speed is controlled, and the input shaft speed of the transmission is synchronized with the speed corresponding to the next gear position, the gear at the next gear position is engaged. Thereafter, the assist clutch is disengaged. According to such a way, the drive torque is changed from the one corresponding to the gear ratio before shifting to the one corresponding to the gear ratio of the assist clutch, and then to the one corresponding to the gear ratio after shifting. Thus the interruption of the drive torque is avoided and smooth shifting can be carried out.

SUMMARY OF THE INVENTION

Problems to be Solved by the Invention

In an automatic transmission as described in U.S. Pat. No. 2,703,169, to avoid the interruption of the drive torque and extend the shifting area widely, the gear ratio of the gear (assist gear) for engaging the assist clutch must be set on the high speed side. However, when the gear ratio of the assist gear is high, for example, in a case of shifting from the 1st gear position to the 2nd gear position, during a period of changing the drive torque from the one corresponding to the 1st gear position to the one corresponding to the assist gear, and during a period of changing the drive torque from the one corresponding to the assist gear to the one corresponding to the 2nd gear position, the difference in the drive torque is increased. Accordingly, the shift quality may be deteriorated.

An object of the present invention is to provide a control method and a control apparatus of an automatic transmission in which the torque difference in the drive torque during shifting is small and the shift quality is improved.

Means for Solving the Problems

To accomplish the above object, the present invention provides the following control method and a control apparatus of an automatic transmission. The automatic transmission comprises: an input shaft rotating by torque from a drive power source; an output shaft for outputting a rotation torque to a drive shaft of a vehicle; plural idle gears for transferring the rotation torque between the input shaft and output shaft; and plural synchromeshes that constitute respective gear positions by engaging with each idle gear. The synchromeshes are equipped with; plural hubs rotating integrally with the input shaft or the output shaft; plural sleeves respectively provided on the hubs, rotatable integrally with the hubs and movable axially on the hubs; and plural rings respectively provided between the hubs and idle gears. Moving any of the sleeves toward the corresponding idle gear, any of the rings is pressed on the idle gear, the rotation torque from the input shaft is transferred to the output shaft through the ring and idle gear by the friction, and the sleeve can move to engage into the idle gear with synchronized speed. Wherein the control of the automatic transmission comprising: when shifting the gear position into a target gear position from a current gear position at the shifting start, using some gear position different from the current gear position as one distributing gear position, so that controlling the pressing load of a synchromesh of one distributing (sharing) gear position to transfer at least part of the rotation torque from the drive power source by the friction, thereby releasing at least part of the rotation torque transferred by a synchromesh of the current gear position;

moving the synchromesh of the current gear position to a disengaging position not meshed with the idle gear;

thereafter using another gear position different from the target gear position and one distributing gear position as another distributing gear position, so that controlling the pressing load of the synchromesh of another distributing gear to increases gradually the transfer torque by the friction, and simultaneously decreasing gradually the pressing load of the synchromesh of one distributing gear position;

besides such a distribution of transfer torque, synchronizing the speed of the input shaft with the speed corresponding to the target gear position by controlling the speed of the input shaft, and then moving the synchromesh of the target gear position to the meshing position.

By use of such a method or an apparatus, according to the gear ratios before shifting and after shifting at the time of shifting, two synchromeshes for making the torque difference during shifting smaller can be selected. For example, when shifting from the 1st gear position to the 2nd gear position (target gear position), the difference of the drive torques during changing from 1st gear position to the releasing gear position (the changing is performed before moving the synchromesh of the 1st gear position to the disengaging position not meshed with the 1st idle gear) can be made smaller. And the difference of the drive torques during changing from another distributing gear position to 2nd gear position (distributing of the transfer torque: gear position the change of the transfer torque gear to gear) can be also made smaller Therefore the interruption of the drive torque during shifting can be avoided without impairing the shift quality.

DETAILED DESCRIPTION OF THE INVENTION

Description of the Preferred Embodiments

The constitution and control method for the control apparatus of the automatic transmission of an embodiment of the present invention will be explained hereunder by referring to FIGS. 1 to 18.

Firstly, the constitution of the control apparatus of the automatic transmission of this embodiment will be explained by referring to FIG. 1.

Figure 1:
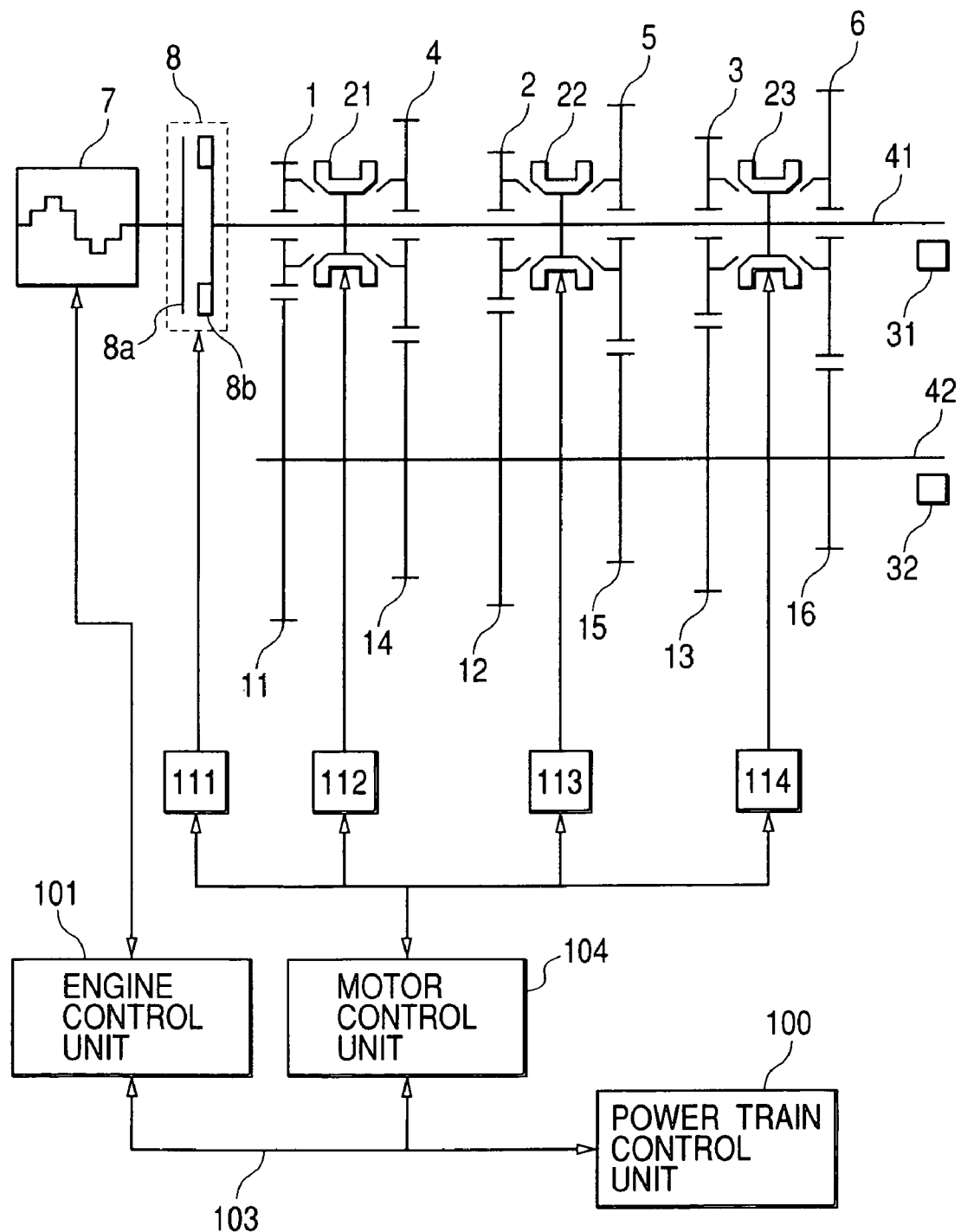
FIG. 1 is a skeleton diagram showing the constitution of the control apparatus of the automatic transmission of an embodiment of the present invention.

FIG. 1 is a skeleton diagram showing the constitution of the control apparatus of the automatic transmission of the embodiment.

An engine 7 which is a drive power source has an engine-speed sensor (not shown in the drawing) for measuring the speed of the engine 7, an electronic throttle (not shown in the drawing) for regulating the engine torque, and a fuel injection apparatus (not shown in the drawing) for injecting the amount of fuel corresponding to the amount of intake air. An engine control unit 101 operates the amount of intake air, the amount of fuel, and the ignition time, thereby can control the torque of the engine 7 with high accuracy. As a fuel injector, there are an air intake port injection system for injecting fuel into an air intake port and an intra-cylinder injection system for injecting fuel directly into a cylinder. Whether or not, it is advantageous to use the engine of a system capable of reducing the cost of fuel and realizing high exhaust performance. As a drive power source, not only a gasoline engine but also a diesel engine, a natural gas engine, or a motor may be used.

A clutch 8 for the input shaft of the transmission is connected with the engine 7. The clutch 8 has an input disk 8a and an output disk 8b. The input disk 8a is connected with the output shaft of the engine 7. When the input disk 8a and the output disk 8b are engaged or disengaged, the torque of the engine 7 can be transferred to or interrupted from an input shaft 41 of the transmission. Though a dry single-plate clutch is generally used for the clutch 8, instead of it, every clutch including a wet multi-plate clutch and an electromagnetic clutch may be used. The engaging force (clutch torque) between the input disk 8a and the output disk 8b is controlled by an actuator 111 driven with the motor. By regulating the holding force (clutch torque), the output of the engine 7 can be transferred to or interrupted from the input shaft 41.

The transmission comprises the input shaft 41, an output shaft 42, the first drive gear 1, the second drive gear 2, the third drive gear 3, the fourth drive gear 4, the fifth drive gear 5, the sixth drive gear 6, the first driven gear 11, the second driven gear 12, the third driven gear 13, the fourth driven gear 14, the fifth driven gear 15, the sixth driven gear 16, the first synchromesh 21, the second synchromesh 22, the third synchromesh 23, a rotation sensor 31 for the input shaft, and a rotation sensor 32 for the output shaft.

The first drive gear 1, the second drive gear 2, the third drive gear 3, the fourth drive gear 4, the fifth drive gear 5, and the sixth drive gear 6, which are idle gears, are installed rotatably and freely on the input shaft 41 of the transmission. Further, the transmission has the rotation sensor 31 (an input shaft speed detection means) for detecting the speed of the input shaft 41.

On the other hand, the first driven gear 11, the second driven gear 12, the third driven gear 13, the fourth driven gear 14, the fifth driven gear 15, and the sixth driven gear 16 are installed on the output shaft 42 of the transmission. The first driven gear 11, the second driven gear 12, the third driven gear 13, the fourth driven gear 14, the fifth driven gear 15, and the sixth driven gear 16 are fixed to the output shaft 42 of the transmission. The transmission has an output shaft rotation sensor 32 (an output shaft speed detection means) for detecting the speed of the output shaft 42 of the transmission.

Among these gears, the first drive gear 1 meshes with the first driven gear 11, and the second drive gear 2 meshes with the second driven gear 12. The third drive gear 3 meshes with the third driven gear 13, and the fourth drive gear 4 meshes the fourth driven gear 14. The fifth drive gear 5 meshes with the fifth driven gear 15, and the sixth drive gear 6 meshes with the sixth driven gear 16.

The first synchromesh 21 is provided between the first drive gear 1 and the fourth drive gear 4. The first synchromesh 21 joins the first drive gear 1 or the fourth drive gear 4 to the input shaft 41. Therefore, the rotation torque inputted to the input shaft 41 is transferred via the first synchromesh 21 to the first drive gear 1, the first driven gear 11, and the output shaft 42, or transferred to the fourth drive gear 4, the fourth driven gear 14, and the output shaft 42 of the transmission.

The second synchromesh 22 is provided between the second drive gear 2 and the fifth drive gear 5. The second synchromesh 22 joins the second drive gear 2 or the fifth drive gear 5 to the input shaft 41. Therefore, the rotation torque inputted to the input shaft 41 is transferred via the second synchromesh 22 to the second drive gear 2, the second driven gear 12, and the output shaft 42, or transferred to the fifth drive gear 5, the fifth driven gear 15, and the output shaft 42.

The third synchromesh 23 is provided between the third drive gear 3 and the sixth drive gear 6. The third synchromesh 23 joins the third drive gear 3 or the sixth drive gear 6 to the input shaft 41. Therefore, the rotation torque inputted to the input shaft 41 is transferred via the third synchromesh 23 to the third drive gear 3, the third driven gear 13, and the output shaft 42, or transferred to the sixth drive gear 6, the sixth driven gear 16, and the output shaft 42.

In order to transfer the rotation torque of the input shaft 41 to the output shaft 42, it is necessary to move any of the first synchromesh 21, the second synchromesh 22, and the third synchromesh 23 in the axial direction of the input shaft 41, and to join the moved synchromesh with any of the first drive gear 1, the second drive gear 2, the third drive gear 3, the fourth drive gear 4, the fifth drive gear 5, and the sixth drive gear 6. The first synchromesh 21 is moved by the shift actuator 112. The second synchromesh 22 is moved by the shift actuator 113. The third synchromesh 23 is moved by the shift actuator 114.

The rotation torque of the input shaft 41 is transferred to the output shaft 42 via any of the first drive gear 1, the second drive gear 2, the third drive gear 3, the fourth drive gear 4, the fifth drive gear 5, and the sixth drive gear 6, and any of the first driven gear 11, the second driven gear 12, the third driven gear 13, the fourth driven gear 14, the fifth driven gear 15, and the sixth driven gear 16. Thereafter, the rotation torque is transferred to the vehicle shaft (not shown in the drawing) via the differential gear (not shown in the drawing) connected to the output shaft 42.

The clutch actuator 111 is controlled by a motor control unit 104.

The motor control unit 104 controls the current of the motor (not shown in the drawing) installed in the clutch actuator 111, thereby controls the transfer torque of the clutch. The clutch actuator 111 is comprised of a motor, and a motion transformation mechanism for changing the rotary motion of the speed reduction gear and motor into linear motion. For example, the motion transformation mechanism comprises a worm gear and a ball screw.

In this embodiment, though the clutch actuator 111 comprises a motor, it may comprise an actuator driven by oil pressure.

The shift actuators 112, 113, and 114 are respectively controlled by the motor control unit 104. The motor control unit 104 controls the currents of the motors (not shown in the drawing) installed in the shift actuator 112, 113, and 114, thereby can control the pressing load for operating the first synchromesh 21, the second synchromesh 22, and the third synchromesh 23 or the position thereof. The shift actuator 112, 113, and 114 are respectively comprised of a motor, and a motion transformation mechanism for changing the rotary motion of the speed reduction gear and motor into linear motion. For example, the motion transformation mechanism comprises a worm gear and a ball screw.

In the constitution shown in FIG. 1, the first synchromesh 21 is controlled through the shift actuator 112. Thereby, the first synchromesh 21 meshes with the first drive gear 1 to set the 1st gear position, or the first synchromesh 21 meshes with the fourth drive gear 4 to set the 4th gear position.

The second synchromesh 22 is controlled through the shift actuator 113. Thereby, the second synchromesh 22 meshes with the second drive gear 2 to set the 2nd gear position, or the second synchromesh 21 meshes with the fifth drive gear 5 to set the 5th gear position.

The third synchromesh 23 is controlled through the shift actuator 114. Thereby, the third synchromesh 23 meshes with the third drive gear 3 to set the 3rd gear position, or the third synchromesh 23 meshes with the sixth drive gear 6 to set the 6th gear position.

In this embodiment, though the shift actuator 112,113 and 114 comprise motors, they may comprise actuators driven by oil pressure.

The engine control unit 101 controls the amount of intake air, the amount of fuel, and the ignition time, thereby can control the torque of the engine 7 with high accuracy.

The motor control unit 104 and the engine control unit 101 are controlled by a power train control unit 100. The power train control unit 100, the engine control unit 101, and the motor control unit 104 mutually transmit and receive information by a communication means 103.

Next, the constitution of the synchromesh used for the automatic transmission of this embodiment will be explained by referring to FIG. 2.

Figure 2:
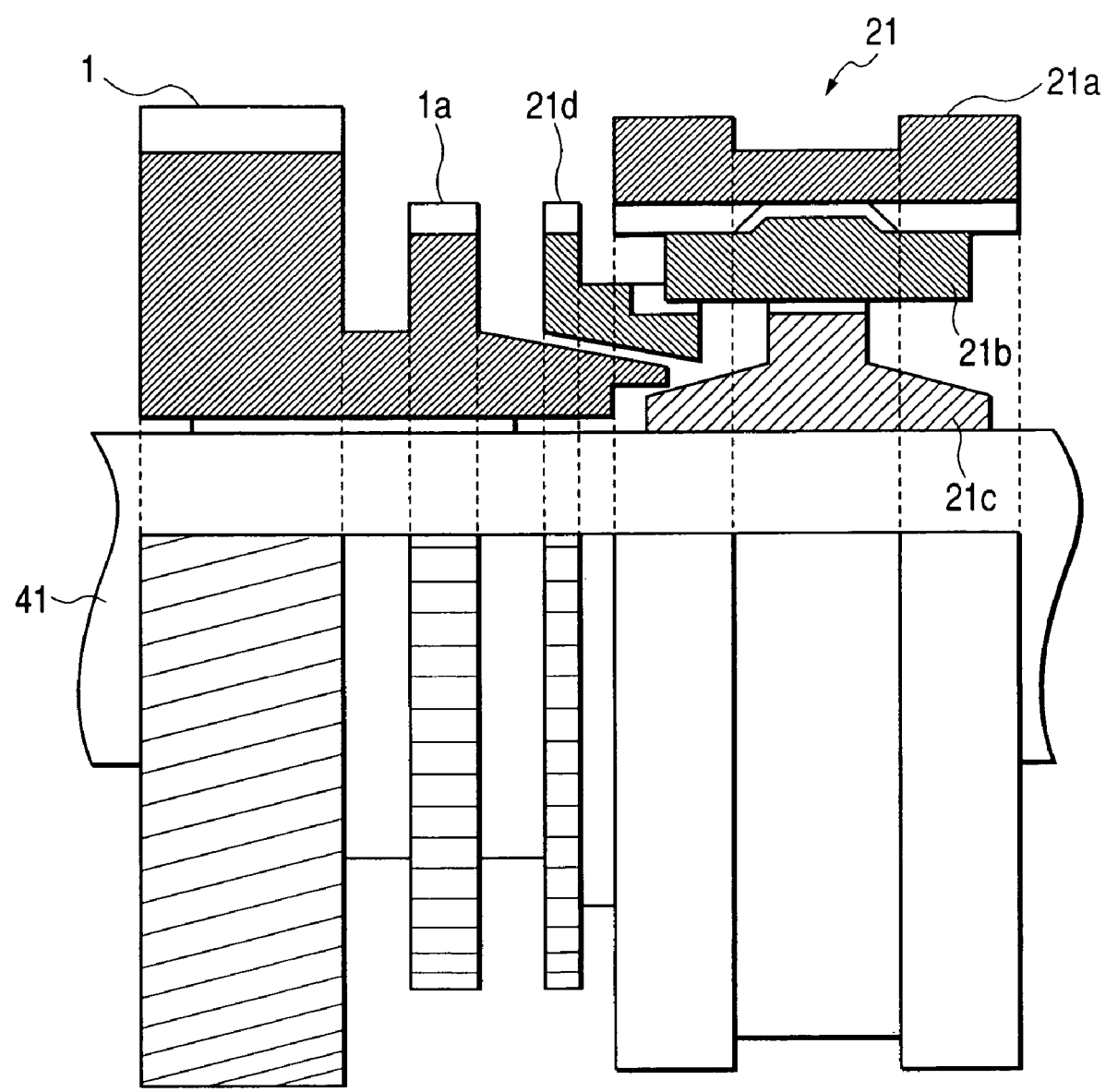
FIG. 2 is an enlarged cross sectional view of a synchromesh used in a transmission controlled by the control apparatus of the automatic transmission of an embodiment of the present invention.

FIG. 2 is an enlarged cross sectional view of the synchromesh. FIG. 2 shows the first synchromesh 21, the input shaft 41 of the transmission, and the first drive gear 1 shown in FIG. 1 which are extracted and enlarged.

The synchromesh 21 has a sleeve 21*a*, a key 21*b*, a hub 21*c*, and a ring 21*d*. The sleeve 21*a* is spline-fit into the hub 21*c* rotating integrally with the input shaft 41. When a pressing load is applied to the sleeve 21*a*, the key 21*b* moves together with the sleeve 21*a* and presses the ring 21*d* to the cone part of the first drive gear 1 which is an idle gear by the end face thereof. Friction is acted on the cone face between the ring 21*d* and the first drive gear 1, thus the torque is transferred, and the rotation of the first drive gear 1 gradually approaches the rotation of the sleeve 21*a*.

When the sleeve 21*a* moves further, thereby is dismeshed from the key 21*b*, the sleeve 21*a* directly presses the ring 21*d*. Then, friction is acted on the cone face between the ring 21*d* and the first drive gear 1, thus the torque is transferred, and the rotation of the first drive gear 1 coincides and synchronizes with the rotation of the sleeve 21*a*.

Then, the ring 21*d* can rotate freely and will not disturb the movement of the sleeve 21*a*. As a result, the sleeve 21*a* passes through the ring 21*d* and completely meshes with dog teeth 1*a* of the first drive gear 1 and the shifting is completed.

In this embodiment, the single cone type having one cone face of the synchromesh is used. However, there are various types available such as the double cone type having two cone faces and the triple cone type having 3 cone faces, and it is advantageous to use a bulk type having a plurality of cone faces so as to transfer large torque at a small pressing load. Further, in this embodiment, the synchromesh is of an inertia lock key type. However, there are various types available such as the pin type and servo type and the synchromesh can be formed by any type.

Next, the input-output signal relationship between the power train control unit 100, the engine control unit 101, and the motor control unit 104 which are used in the control apparatus of the automatic transmission of this embodiment will be explained by referring to FIG. 3.

Figure 3:
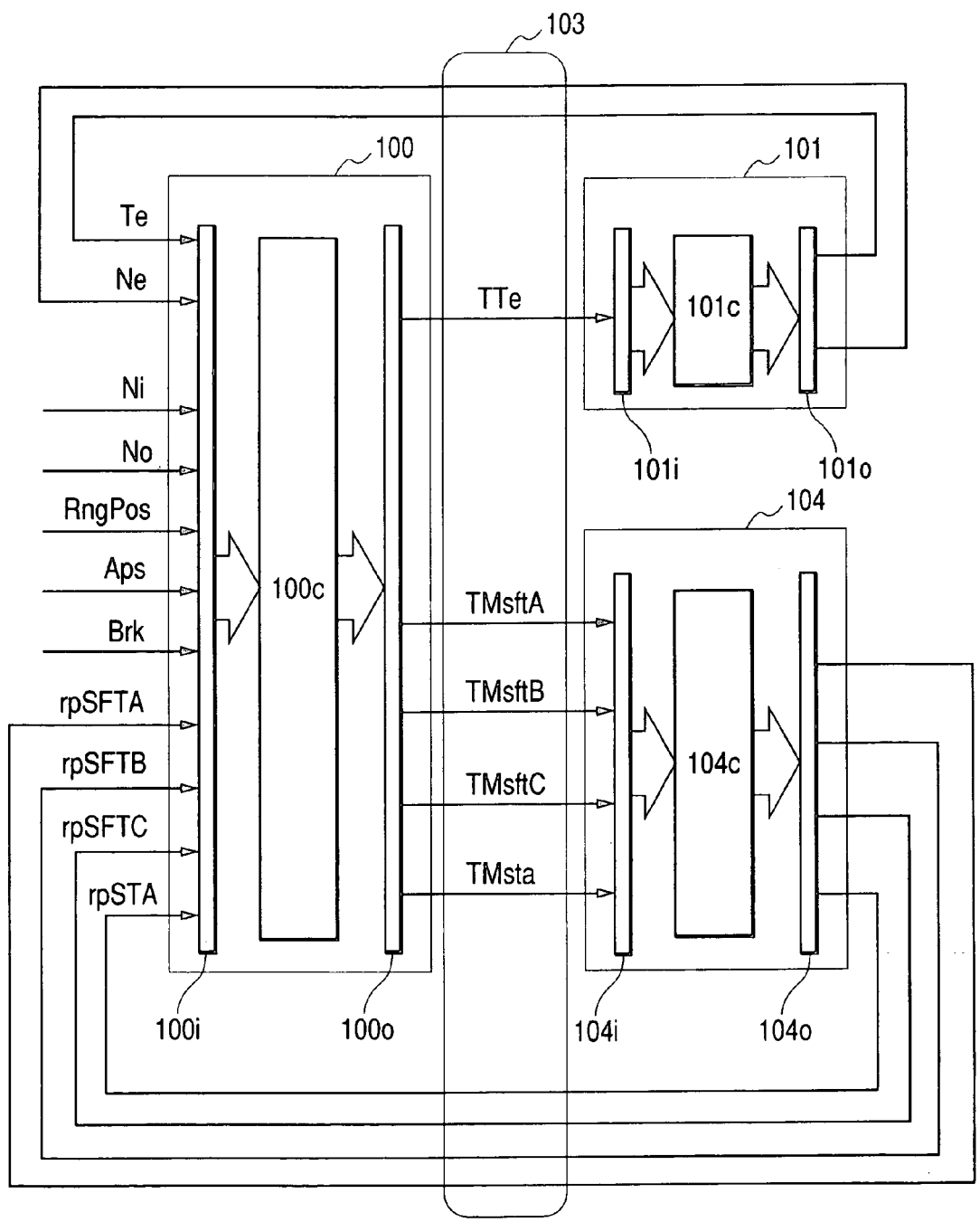
FIG. 3 is a block diagram showing the input-output signal relationship among a power train control unit 100, an engine control unit 101, and a motor control unit 104 used in the control apparatus of the automatic transmission of an embodiment of the present invention.

FIG. 3 is a block diagram showing the input-output signal relationship among the power train control unit 100, the engine control unit 101, and the motor control unit 104.

The power train control unit 100 has an input unit 100*i*, an output unit 100*o*, and a computer 100*c*. The engine control unit 101 has an input unit 101*i*, an output unit 101*o*, and a computer 10*c*. The motor control unit 104 has an input unit 104*i*, an output unit 104*o*, and a computer 104*c*.

The power train control unit 100 transmits an engine torque command TTe to the engine control unit 101 using the communication means 103. The engine control unit 101, so as to realize the engine torque command TTe, controls the amount of intake air, the amount of fuel, and the ignition time etc. The engine control unit 101 has a detection means (not shown in the drawing) of the engine torque which is input torque to the transmission. The engine control unit 101 detects the speed Ne of the engine 7 and engine torque Te generated by the engine 7, and transmits them to the power train control unit 100 using the communication means 103. The engine torque detection means may use a torque sensor or may be a means for inferring the engine torque by the parameters of the engine such as the injection pulse width of an injector, the pressure in the air intake tube, and the speed of the engine.

The power train control unit 100 transmits a target torque TMsftA of the shift actuator 12, a target torque TMsftB of the shift actuator 13, a target torque TMsftC of the shift actuator 14, and a target torque TMsta of the clutch actuator to the motor control unit 104. The motor control unit 104 controls the motor current of the shift actuator 112 so as to realize the target torque TMsftA, thereby the pressing, the engaging and the disengaging of the first synchromesh 21 are performed. Further the motor control unit 104 controls the motor current of the shift actuator 113 so as to realize the target torque TMsftB, thereby the pressing, the engaging and the disengaging of the second synchromesh 22 are performed. Furthermore, the motor control unit 104 controls the motor current of the shift actuator 114 so as to realize the target torque TMsftC, thereby the pressing, the engaging and the disengaging of the third synchromesh 23 are performed. Further, the motor control unit 104 controls the motor current of the clutch actuator 111 so as to realize the clutch motor target torque Tmsta, thereby the engaging and disengaging of the input disk 8*a* and the output disk 8*b* are performed The motor control unit 104 detects a shift position signal rpSFTA indicating the stroke of the first synchromesh 21, a shift position signal rpSFTB indicating the stroke of the second synchromesh 22, a shift position signal rpSFTC indicating the stroke of the third synchromesh 23, and a position signal rpSTA indicating the stroke of the clutch 8, and transmits them to the power train control unit 100.

The input shaft speed Ni detected by the rotation sensor 31 and the output shaft speed No detected by the rotation sensor 32 are input to the powertrain control unit 100. Further, a range position signal RngPos indicating the shift lever position of the range P, range R, range N, or range D; an accelerator pedal position signal Aps; and an ON/OFF signal Brk from the break switch for detecting whether the break is stepped on or not, are input to the power train control unit 100, For example, when a driver puts the shift range in the range D and steps on the accelerator pedal, the power train control unit 100 judges that the driver wishes start and acceleration. When the driver steps on the break pedal, the control unit judges that the driver wishes deceleration and stop. And, the power train control unit 100, so as to realize these intentions of the driver, sets the engine torque command TTe, the target torque TMsftA of the shift actuator 12, the target torque TMsftB of the shift actuator 13, the target torque TMsftC of the shift actuator 14, and the target torque TMsta of the clutch actuator 8. Further, the power train control unit 100 sets the gear position on the basis of the vehicle speed Vsp calculated from the output shaft speed No and the accelerator pedal position Aps, and also sets the engine torque command TTe, the target torque TMsftA, the target torque TMsftB, the target torque TMsftC and the clutch motor target torque TMsta so as to perform the shifting operation to the set gear position.

Next, the contents of the shift control by the automatic transmission of this embodiment will be explained by referring to FIGS. 4 to 16.

Firstly, the overall control contents of the control apparatus of the automatic transmission will be explained roughly by referring to FIG. 4.

Figure 4:
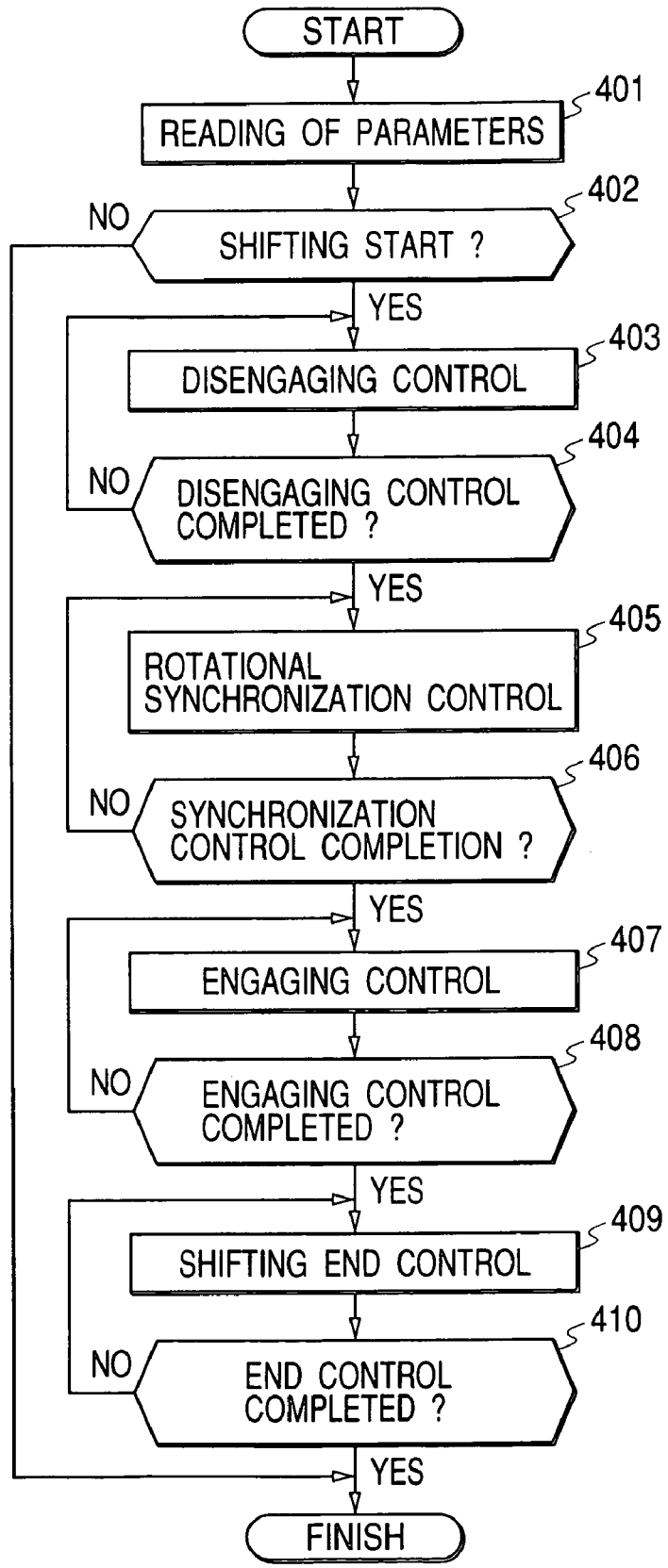
FIG. 4 is a flow chart showing the outline of overall control contents of the control apparatus of the automatic transmission of an embodiment of the present invention.

FIG. 4 is a flow chart showing the outline of the overall control contents of the control apparatus.

The shift control contents indicated below are programmed in the computer 100*c* of the power train control unit 100 and performed repeatedly in a predetermined cycle. Namely, the processes at Steps 401 to 410 indicated below are performed by the power train control unit 100.

At Step 401, the power train control unit 100 reads the parameters used at Steps 402 to 410.

At Step 402, the power train control unit 100 sets the gear position on basis of the vehicle speed Vsp and the accelerator pedal position Aps. And when the set gear position is different from the gear position now in use, the control unit 100 judges that to be start of shifting and goes to Step 403. When the set gear position is the same as the gear position now in use, the power train control unit 100 judges unnecessity of shifting and finishes the processing.

When the shifting operation is started, at Step 403 (the disengaging control phase), the power train control unit 100 performs the disengaging control to disengage the gear. The disengaging control will be described later in detail.

Next, at Step 404, the power train control unit 100 judges whether the disengaging control is completed or not. When the disengaging control is completed, the process goes to Step 405. When it is not completed, the control unit 100 performs Step 403 again.

At step 404, the power train control unit 100 judges whether the first synchromesh 21, the second synchromesh 22, and third synchromesh 23 are respectively in the stroke positions disengaged from the corresponding drive gears 1,4,2,5,3,6. Such judgment is performed by using the shift position signal rpSFTA indicating a stroke position of the first synchromesh 21, the shift position signal rpSFTB indicating a stroke position of the second synchromesh 22, and the shift position signal rpSFTC indicating a stroke position of the third synchromesh 23. For example, in the case of the 1st gear composed by the first synchromesh 21 and the first drive gear 1, the thresholds for judging whether the first synchromesh 21 is in the stroke positions disengaged from the drive gear 11 are set to SF1 OFF and SF4 OFF. And when the shift position signal rpSFTA meets the condition SF1 OFF=rpSFTA=SF4 OFF, the power train control unit 100 judges that the first synchromesh 21 is in the stroke positions disengaged from the drive gear 11. Here, the thresholds SF1 OFF and SF4OFF indicate the positions where the first synchromesh 21 is not meshed with either of the first drive gear 1 and the fourth drive gear 4. The thresholds are desirably within a range as wider as possible.

Further, the contents of the judgment may be also that the power train control unit 100 judges by the shift position rpSFTA etc.whether the first synchromesh 21 etc are respectively start to move to the disengaging position.

Next, at Step 405 (the rotational synchronization control phase), the power train control unit 100 controls the pressing load of the synchromesh so as to synchronize the input speed with the speed (the target speed) corresponding to the next gear position, For example, when shifting from the 1st gear position to the 2nd gear position, as described later, the power train control unit 100 controls the pressing loads of the second synchromesh 22 and the third synchromesh 23. The rotational synchronization control will be described later in detail.

And at Step 406, the power train control unit 100 judges whether the rotational synchronization control is completed or not. The condition of the completion of the rotational synchronization control is that the difference between the speed (the target speed) of the next gear position and the input speed Ni gets smaller (|input speed Ni−output speed No×target gear position gear ratio γn| is small). For the judgment whether the rotation difference meets the condition, it is desirable to provide a time delay. When the synchronization control is completed, the process goes to Step 407, or when the synchronization control is not completed, the process goes to Step 405 again and continues the synchronization control.

When the rotational synchronization control is completed, at Step 407 (the engaging control phase), the power train control unit 100 performs the engaging control to engage the gear. The engaging control will be described later in detail.

And at Step 408, the power train control unit 100 judges whether the engaging control is completed or not. Here, the completion condition of the engaging control is taken by the judgment of whether the synchromesh meshes with the drive gear corresponding to the target gear position. For example, in the case of the 2nd gear composed by the second synchromesh 22 and the second drive gear 2, the thresholds for judging whether the second synchromesh 22 meshes with the second drive gear 2 is set to SF2ON. The power train control unit 100 judges the 2nd gear position when the shift position signal rpSFTB becomes rpSFTB=SF2 ON. When the engaging control is completed, the process goes to Step 409. When the engaging control is not completed, the process goes to Step 407 again and continues the engaging control.

When the engaging control is completed, at Step 409 (the shifting end phase), the power train control unit 100 performs the shifting end control. The shifting end control will be described later in detail.

At Step 410, the power strain control unit 100 judges completion of the shifting or not. Here, the completion condition of the shifting end control, for example, in a case of shifting from the 1st gear position to the 2nd gear position, is judged by whether the pressing load of the third synchromesh 23 is zero or not. When the shifting is completed, the power train control unit 100 finishes the processing. When the shifting is not completed, the power train control unit 100 continues Step 409 again.

Next, the concrete contents of the shift control of the automatic transmission in this embodiment will be explained by referring to FIGS. 5 to 10.

Figure 5:
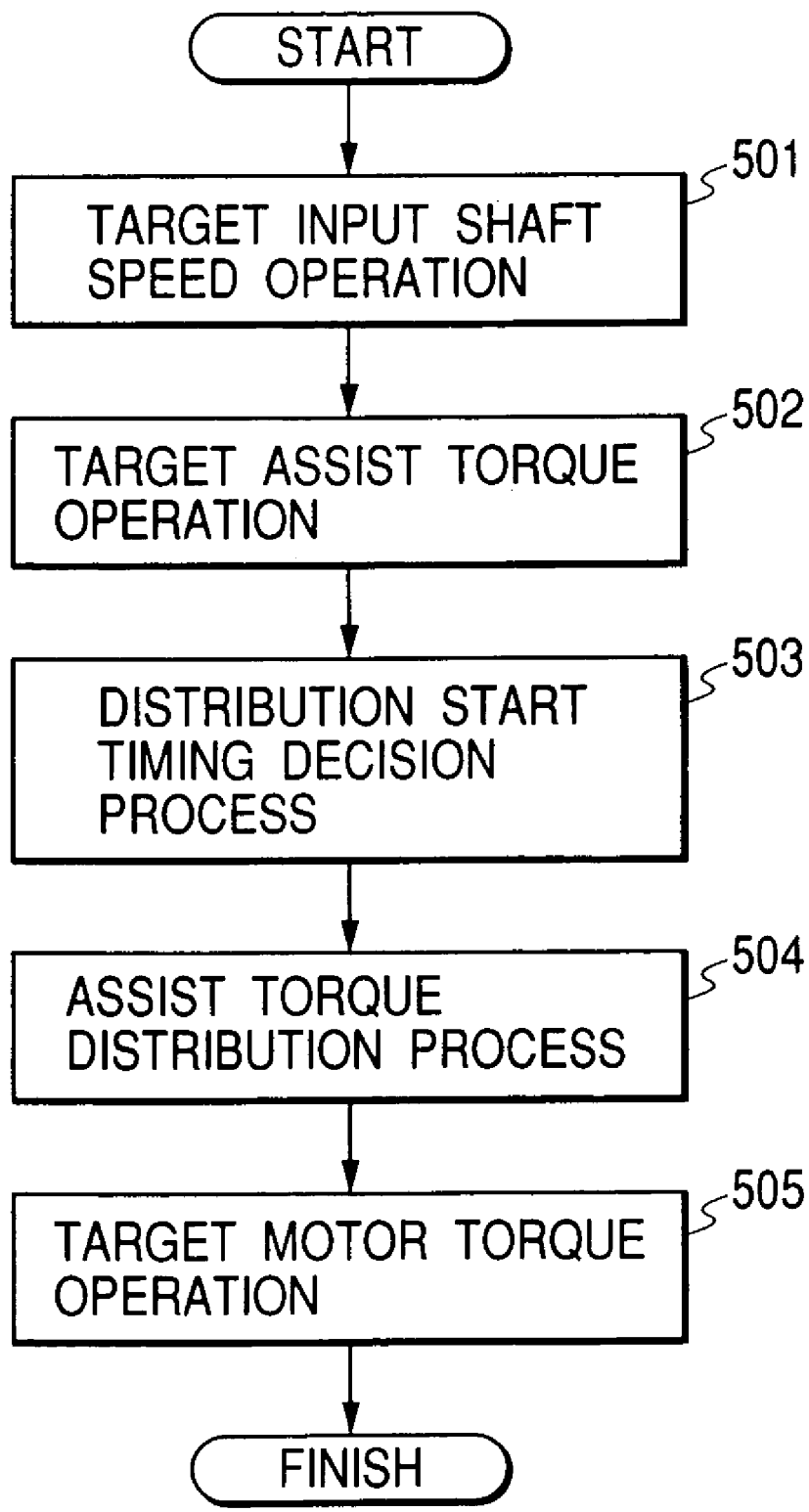
FIG. 5 is a flow chart showing the overall processing contents of the concrete shift control contents of the control apparatus of the automatic transmission of an embodiment of the present invention.

FIG. 5 shows the contents of the overall shift control of the automatic transmission. The flow chart shown in FIG. 5 indicates processes of calculating and deciding the parameters of the disengaging control process at Step 403 shown in FIG. 4, the rotational synchronization control process at Step 405, and the engaging control process at Step 407.

FIG. 5 is a flow chart showing the overall processing contents of the concrete shift control performed by the control apparatus of the automatic transmission in the embodiment.

The shift control flow is composed of Step 501 (the target input shaft speed operation), Step 502 (the target assist torque operation), Step 503 (the distribution start timing decision process), Step 504 (the assist torque distribution process), and Step 505 (the target motor torque operation). The contents of FIG. 5 are programmed in the computer 100c of the power train control unit 100 and performed repeatedly in a predetermined cycle. Namely, the processes at Steps 501 to 505 indicated below are performed by the power train control unit 100. Step 501 (the target input shaft speed calculation) is described in FIG. 6 in detail, Step 502 (the target assist torque calculation) in FIG. 7 in detail, Step 503 (the distribution start timing decision process) in FIG. 8 in detail, Step 504 (the assist torque distribution process) in FIG. 9 in detail, and Step 505 (the target motor torque calculation) in FIG. 10 in detail.

Next, Step 501 (the target input shaft speed calculation) shown in FIG. 5 will be explained in FIG. 6 in detail.

Figure 6:
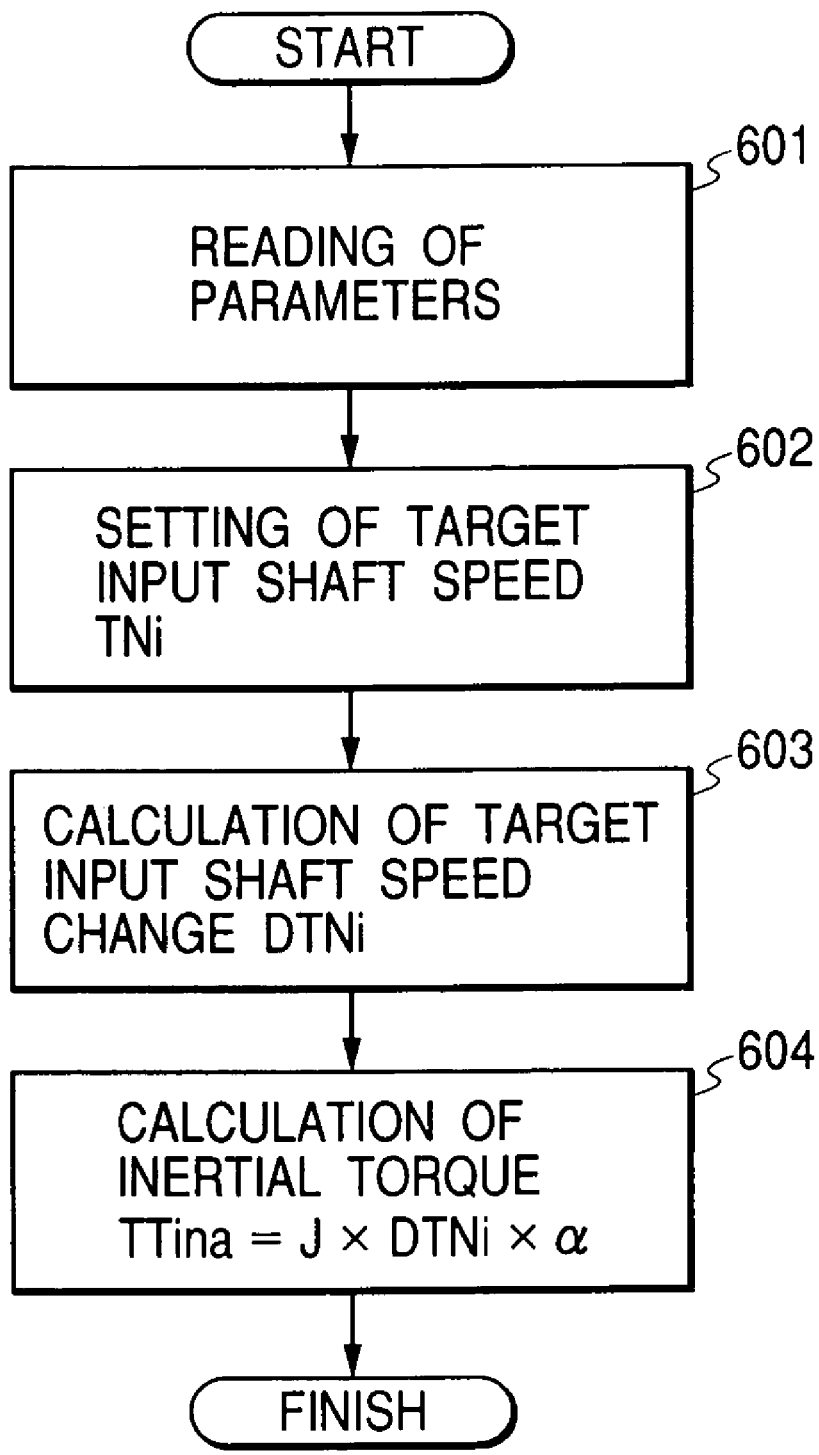
FIG. 6 is a flow chart showing the processing contents of the target input shaft speed operation of the control apparatus of the automatic transmission of an embodiment of the present invention.

FIG. 6 is a flow chart showing the processing contents of the target input shaft speed calculation of the control apparatus of the automatic transmission.

At Step 601, the power train control unit 100 reads the parameters used at Steps 602 to 604.

Next, at Step 602, the power train control unit 100 sets a target input shaft speed TNi. The target input shaft speed TNi is set on the basis of the shifting pattern and output shaft speed so that the speed corresponding to the gear position before shifting is smoothly changed into the speed corresponding to the gear position after shifting during the rotational synchronization. The target input shaft speed TNi will be described later by referring to FIG. 11(A).

Next, at Step 603, the power train control unit 100 calculates a change DTNi of the target input shaft speed TNi. Next, at Step 604, the power train control unit 100 calculates inertia torque TTina. Here, assuming the inertia coefficient from the engine to the input shaft as J, and the unit conversion coefficient as α, inertia torque TTina=J×DTNi×α is calculated. The inertia torque TTina is used at Step 708 shown in FIG. 7 which will be described later.

Next, Step 502 (the target assist torque operation) shown in FIG. 5 will be explained in detail by referring to FIG. 7.

Figure 7:
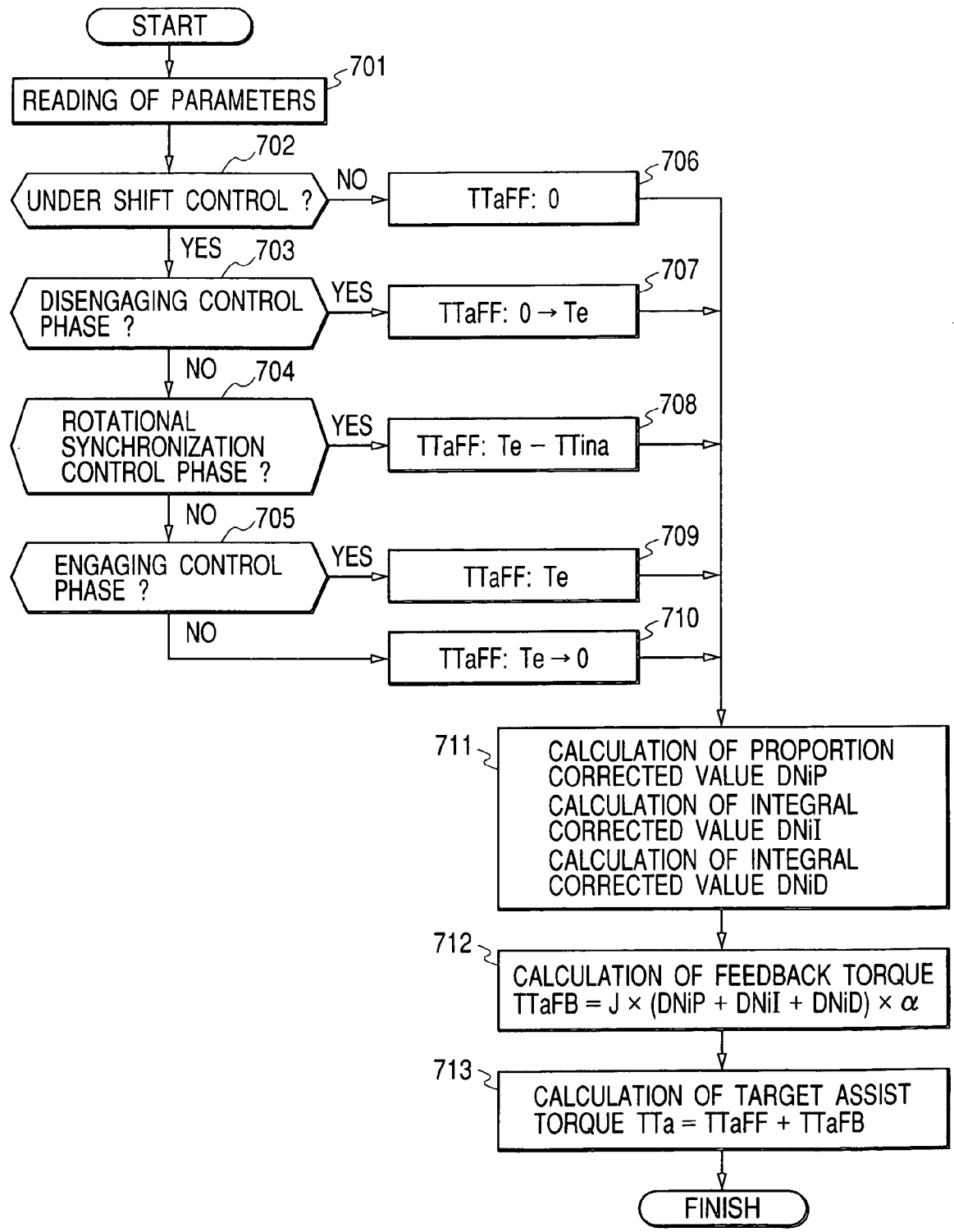
FIG. 7 is a flow chart showing the processing contents of the target assist torque operation of the control apparatus of the automatic transmission of an embodiment of the present invention.

FIG. 7 is a flow chart showing the processing contents of the target assist torque calculation performed by the control apparatus of the automatic transmission.

At Step 701, the power train control unit 100 reads the parameters used at Steps 702 to 713.

Next, at Step 702, the power train control unit 100 judges whether the apparatus is under shift control or not. When the apparatus is under shift control, the process goes to Step 703. When the apparatus is not under shift control, the process goes to Step 706. At Step 706, the power train control unit 100 sets target assist torque feedforward value (TtaFF) to TtaFF=0, and goes to Step 711.

When the apparatus is under shift control, at Step 703, the power train control unit 100 judges whether the disengaging control phase is set or not. When the disengaging control phase is not set, the process goes to Step 704. When the disengaging control phase is set, the process goes to Step 707. At Step 707, the power train control unit 100 gradully brings the target assist torque feedforward value TTaFF from 0 to the engine torque Te and goes to Step 711. The engine torque Te, as described previously, is a value detected by the engine control unit 101.

When the disengaging control phase is not set, at Step 704, the power train control unit 100 decides whether the rotational synchronization control phase is set or not, and when the rotational synchronization control phase is not set, the process goes to Step 705, and when the rotational synchronization control phase is set, the process goes to Step 708. At Step 708, the power train control unit 100 sets target assist torque feedforward value TTaFF=(engine torque Te−inertia torque TTina) and goes to Step 711. The inertia torque TTina is a value obtained at Step 604.

When the rotational synchronization control phase is not set, at Step 705, the power train control unit 100 judges whether the engaging control phase is set or not, and when the engaging control phase is set, the process goes to Step 709. At Step 709, the power train control unit 100 sets target assist torque feedforward value TTaFF=engine torque Te and goes to Step 711.

When the engaging control phase is not set, the process goes to Step 710, gradually brings the target assist torque feedforward value TTaFF from the engine torque Te to 0, and goes to Step 711.

At Step 711, the power train control unit 100 calculates a proportion corrected value DNiP from the deviation between the target input shaft speed TNi and the input shaft speed Ni, calculates an integral corrected value DNiI from the integral value of the deviation, and calculates a differential corrected value DNiD from the differential value of the deviation.

Next, at Step 712, the power train control unit 100 calculates a target assist torque feedback value TTaFB. Here, The inertia-coefficient from the engine to the input shaft is defined as J, and the unit conversion coefficient is defined as α. Using the proportion corrected value DNiP, the integral corrected value DNiI, and the differential corrected value DNiD which are calculated at Step 711, the target assist torque feedback value TTaFB=J×(DNiP+DNiI+DNiD)×α is calculated.

Finally, at Step 713, the power train control unit 100 calculates the target assist torque TTa by adding the feedforward value TTaFF set at Step 706, Step 707, Step 708, Step 709, or Step 710 and the feedback value TTaFB calculated at Step 712. The target assist torque TTa is used at Steps 905, 906, and 908 shown in FIG. 9, which will be described later.

Next, Step 503 (the distribution start timing decision process) shown in FIG. 5 will be explained in detail by referring to FIG. 8. In the process of the Step 503, start timing of the distribution (replacement) of the synchromeshes is decided.

Figure 8:
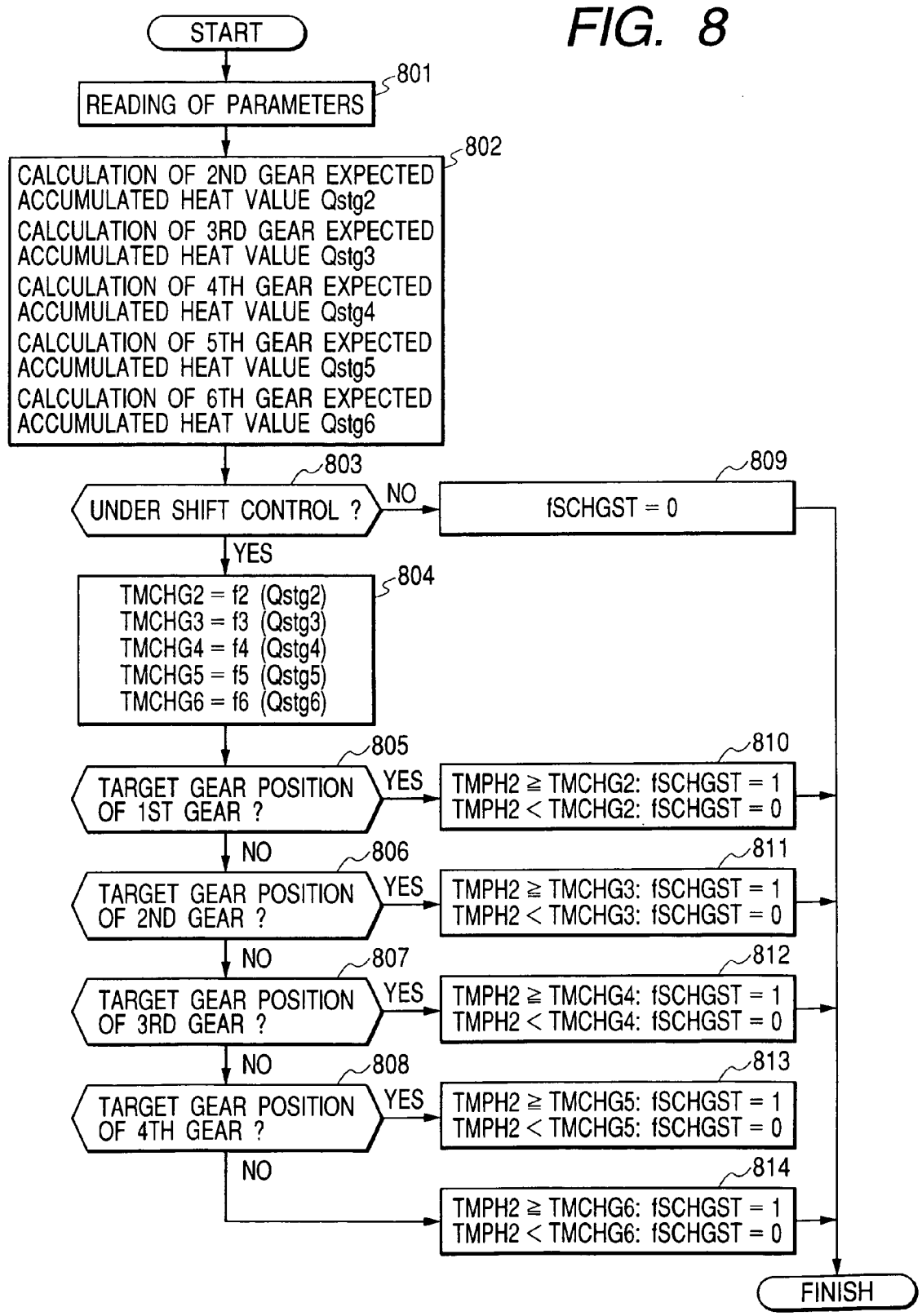
FIG. 8 is a flow chart showing the processing contents of the distribution start timing decision process of the control apparatus of the automatic transmission of an embodiment of the present invention.

FIG. 8 is a flow chart showing the processing contents of the distribution start timing decision process of the control apparatus.

At Step 801, the power train control unit 100 reads the parameters used at Steps 802 to 814.

Next, at Step 802, the power train control unit 100 calculates an inference value Qstg2 of accumulation of heat quantity, which is the value for inferring heat quantity accumulated on the cone face between the ring of the second synchromesh 22 and the second drive gear 2 in the 2nd gear. Further, the unit 100 also calculates an inference value Qstg3 of accumulation of heat quantity, which is the value for inferring heat quantity accumulated on the cone face between the ring of the third synchromesh 23 and the third drive gear 3 in the 3rd gear. Furthermore, the unit 100 calculates an inference value Qstg4 of accumulation of heat quantity, which is the value for inferring heat quantity accumulated on the cone face between the ring of the fourth synchromesh 24 and the fourth drive gear 4 in the 4th gear. Further, the unit 100 calculates an inference value Qstg5 of accumulation of heat quantity, which is the value for inferring heat quantity accumulated on the cone face between the ring of the fifth synchromesh 25 and the fifth drive gear 5 in the 5th gear. Furthermore, the unit 100 calculates an inference value Ostg6 of accumulation of heat quantity, which is the value for inferring heat quantity accumulated on the cone face between the ring of the sixth synchromesh 26 and the sixth drive gear 6 in the 6th gear. Such inference values of accumulation of heat quantity can be inferred from the transfer torque and the differential speed on each cone face, or inferred from the temperature of lubricant.

Next, at Step 803, the power train control unit 100 judges whether the apparatus is under shift control or not. When the apparatus is under shift control, the process goes to Step 804. When the apparatus is not under shift control, at Step 809, the power train control unit 100 sets a distribution start flag fSCHGST to 0 and finishes the process. The distribution start flag fSCHGST is used at Step 904 shown in FIG. 9 which will be described later.

When the apparatus is under shift control, at Step 804, the power train control unit 100 calculates the start time of the distribution of the transfer torque (the change the transfer torque from gear to gear) of each distributing gear position. Here, the distribution of the transfer torque is performed as follows.

When shifting the gear position into a target gear position from a current gear position, some gear position different from the current gear position is used as one distributing gear position. The control unit 100 controls the pressing load of a synchromesh of one distributing gear position to make at least part of the rotation torque from the drive power source transfer by the friction. Thereby it makes at least part of the rotation torque transferred by a synchromesh of the current gear position decrease. And then it moves the synchromesh of said current gear position to a disengaging position not meshed with said idle gear. Thereafter another gear position different from said target gear position and said one distributing gear position is used as another distributing gear position. So that it controls the pressing load of the synchromesh of another distributing gear to make the transfer torque increase gradually by the friction, and simultaneously makes the pressing load of the synchromesh of one distributing gear position decrease gradually. Besides such a distribution of transfer torque, it makes the speed of said input shaft synchronize with the speed corresponding to said target gear position by controlling the speed of said input shaft, and then moves the synchromesh of the target gear position to the meshing position.

Concretely, when changing to the state of transferring the torque by the second synchromesh 22 and the second drive gear 2 used for the 2nd gear, the power train control unit 100 calculates the start time TMCHG2 of the 2nd gear distribution (the change the transfer torque from gear to gear) as a function of the expected accumulated heat quantity Qstg2 of the 2nd gear. Further, when changing to the state of transferring the torque by the third synchromesh 23 and the third drive gear 3 used for the 3rd gear, the control unit 100 calculates the start time TMCHG3 used for the 3rd gear distribution (the change the transfer torque from gear to gear) as a function of the expected accumulated heat quantity Qstg3 of the 3rd gear. Furthermore, when changing to the state of transferring the torque by the first synchromesh 21 and the fourth drive gear 4 used for the 4th gear, the control unit 100 calculates the start time TMCHG4 of the 4th gear distribution (the change the transfer torque from gear to gear) as a function of the expected accumulated heat quantity Qstg4 of the 4th gear. Further, when changing to the state of transferring the torque by the second synchromesh 22 and the fifth drive gear 5 of the 5th gear, the control unit 100 calculates the start time TMCHG5 of the 5th gear distribution (the change the transfer torque from gear to gear) as a function of the expected accumulated heat quantity of the 5th gear. Furthermore when changing to the state of transferring the torque by the third synchromesh 23 and the sixth drive gear 6 used for the 6th gear, the control unit 100 calculates the start time TMCHG6 of the sixth gear distribution (the change the transfer torque from gear to gear) as a function of the expected accumulated heat quantity of the 6th gear.

Here, the functions f2 to f6 are set so as to shorten the distribution start time when the expected accumulated heat quantity is small and so as to prolong the distribution start time when the expected accumulated heat quantity is large. The distribution (the change torque from gear to gear) start time is used at Steps 810, 811, 812, 813, and 814.

Next, at Step 805, the power train control unit 100 judges whether the target gear position is 1st gear or not. When the target gear position is 1st gear, the process goes to Step 810. When the target gear position is other than 1st gear, the process goes to Step 806. At Step 810, the power train control unit 100 compares the magnitude between the continuation time TMPH2 of the rotational synchronization phase and the start time TMCHG2 of 2nd gear distribution. When TMPH2 is not shorter than TMCHG2, the distribution start flag fSCHGST is set to 1 and the process finishes. When TMPH2 is shorter than TMCHG2, the distribution start flag fSCHGST is set to 0 and the process finishes. Namely, the power train control unit 100 monitors the elapsed time (the continuation time TMPH2 of the rotational synchronization phase) after the rotational synchronization phase is set. When the continuation time TMPH2 of the rotational synchronization phase reaches the start time TMCHG2 of the 2nd gear distribution which is calculated beforehand, the distribution start flag fSCHGST is set to 1. When the distribution start flag fSCHGST is set to 1, the power train control unit 100 starts the distribution of torque to the 2nd gear by the processes at Steps 904 and 906 shown in FIG. 9 which will be described later.

When the target gear position is other than 1st gear, at Step 806, the power train control unit 100 judges whether the target gear position is 2nd gear or not. When the target gear position is 2nd gear, the process goes to Step 811. When the target gear position is other than 2nd gear, the process goes to Step 807. At Step 811, the power train control unit 100 compares the magnitude between the continuation time TMPH2 of the rotational synchronization phase and the start time TMCHG3 of the 3rd gear distribution. When TMPH2 is not shorter than TMCHG3, the distribution start flag fSCHGST is set to 1 and the process finishes. When TMPH2 is shorter than TMCHG3, the distribution start flag fSCHGST is set to 0 and the process finishes.

When the target gear position is other than 2nd gear, at Step 807, the power train control unit 100 judges whether the target gear position is 3rd gear or not. When the target gear position is 3rd gear, the process goes to Step 812. When the target gear position is other than 3rd gear, the process goes to Step 808. At Step 812, the power train control unit 100 compares the magnitude between the continuation time TMPH2 of the rotational synchronization phase and the start time TMCHG4 of the 4th gear distribution. When TMPH2 is not shorter than TMCHG4, the distribution start flag fSCHGST is set to 1 and the process finishes. When TMPH2 is shorter than TMCHG4, the distribution start flag fSCHGST is set to 0 and the process finishes.

When the target gear position is other than 3rd gear, at Step 808, the power train control unit 100 judges whether the target gear position is 4th gear or not. When the target gear position is 4th gear, the process goes to Step 813. At Step 813, the power train control unit 100 compares the magnitude between the continuation time TMPH2 of the rotational synchronization phase and the start time TMCHG5 of the 5th gear distribution. When TMPH2 is not shorter than TMCHG5, the distribution start flag fSCHGST is set to 1 and the process finishes. When TMPH2 is shorter than TMCHG5, the distribution start flag fSCHGST is set to 0 and the process finishes.

When the target gear position is other than 4th gear, the process goes to Step 814, and at Step 814, it compares the magnitude between the continuation time TMPH2 of the rotational synchronization phase and the start time TMCHG6 of the 6th gear distribution. When TMPH2 is not shorter than TMCHG6, the distribution start flag fSCHGST is set to 1 and the process finishes. When TMPH2 is shorter than TMCHG6, the distribution start flag fSCHGST is set to 0 and the process finishes.

Further, in place of the inferred value of the accumulated heat quantity obtained at Step 802, the temperature of the synchromesh may be calculated. Namely, at Step 802, the power train control unit 100 calculates respectively the temperature of the cone face between the ring of the second synchromesh 22 and the second drive gear 2 at the 2nd gear position; the temperature of the cone face between the ring of the third synchromesh 23 and the third drive gear 3 at the 3rd gear position; the temperature of the cone face between the ring of the first synchromesh 21 and the fourth drive gear 4 at the 4th gear position; the temperature of the cone face between the ring of the second synchromesh 22 and the fifth drive gear 5 at 5th gear position, and the temperature of the cone face between the ring of the third synchromesh 23 and the sixth drive gear 6 at the 6th gear position. In this case, at Step 804, the power train control unit 100 calculates the start time TMCHG2 of the 2nd gear distribution as a function of the 2nd gear cone face temperature. Similarly, the power train control unit 100 calculates the start time TMCHG3 of the 3rd gear distribution as a function of the 3rd gear cone face temperature, calculates the start time TMCHG4 of the 4th gear distribution as a function of the 4th gear cone face temperature, and calculates the start time TMCHG5 of the 5th gear distribution as a function of the 5th gear cone face temperature. Here, the functions are set so as to shorten the start time of the distribution when the cone face temperature is low, and so as to prolong the start time of the distribution when the cone face temperature is high. The cone face temperature is inferred from the inferred amount of heat of the cone face or detected by a temperature sensor installed to measure the cone face temperature.

Further, in place of the inferred value of the accumulated heat quantity obtained at Step 802, the abrasion loss of the synchromesh may be calculated. Concretely, the power train control unit 100 calculates the abrasion loss of the cone face between the ring of the second synchromesh 22 and the second drive gear 2 at the 2nd gear position, from the change of the stroke position when the synchromesh is applied with a load. Similarly, the power train control unit 100 calculates the abrasion loss of the cone face between the ring of the third synchromesh 23 and the third drive gear 3 at the 3rd gear position, calculates the abrasion loss of the cone face between the ring of the first synchromesh 21 and the fourth drive gear 4 at the 4th gear position, calculates the abrasion loss of the cone face between the ring of the second synchromesh 22 and the fifth drive gear 5 at the 5th gear position, and calculates the abrasion loss of the cone face between the ring of the third synchromesh 23 and the sixth drive gear 6 at the 6th gear position. In this case, at Step 804, the power train control unit 100 sets the start time TMCHG2 of the 2nd gear distribution as a function of the abrasion loss of the 2nd gear cone face. Similarly, the power train control unit 100 sets the start time TMCHG3 of the 3rd gear distribution as a function of the abrasion loss of the 3rd gear cone face, sets the start time TMCHG4 of the 4th gear distribution as a function of the abrasion loss of the 4th gear cone face, and sets the start time TMCHG5 of the 5th gear distribution as a function of the abrasion loss of the 5th gear cone face. Here, the functions are set so as to shorten the start time of the distribution when the abrasion loss of the cone face is small, and so as to prolong the start time of the distribution when the abrasion loss of the cone face is large.

Next, Step 504 (the assist torque distribution process) shown in FIG. 5 will be explained in detail by referring to FIG. 9. The assist torque distribution process performs the distribution of the assist torque (transfer torque) to realize changing over the synchromeshes (transfer torque from gear to gear).

Figure 9:
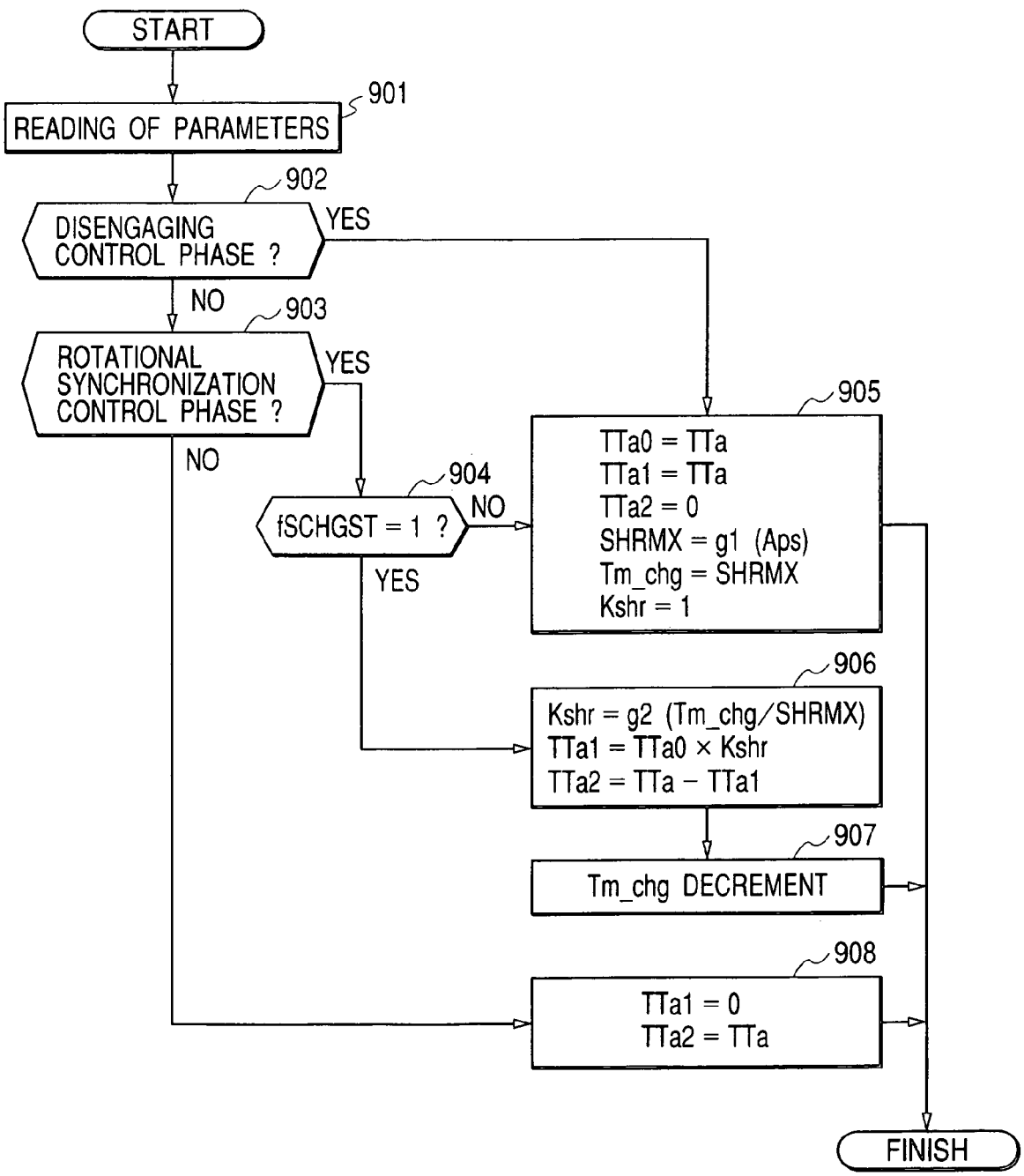
FIG. 9 is a flow chart showing the processing contents of the assist torque distribution process of the control apparatus of the automatic transmission of an embodiment of the present invention.

FIG. 9 is a flow chart showing the processing contents of the assist torque distribution process of the control apparatus of the automatic transmission of the embodiment.

At Step 901, the power train control unit 100 reads the parameters used at Steps 902 to 908.

Next, at Step 902, the power train control unit 100 judges whether the disengaging control phase is set or not. When the disengaging control phase is not set, the process goes to Step 903. When the disengaging control phase is set, the process goes to Step 905. At Step 905, the power train control unit 100 sets "assist torque before distribution start TTa0=target assist torque TTa", "first assist torque TTa1=target assist torque TTa", and "second assist torque TTa2=0", and calculates a torque distribution time SHRMX as a function g1 of an accelerator opening Aps. Further, the unit 100 sets "distribution counter Tm_chg=torque distribution time SHRMX", and sets "distribution rate Kshr=1".

When the disengaging control phase is not set, at Step 903, the power train control unit 100 judges whether the rotational synchronization control phase is set or not. When the rotational synchronization control phase is not set, the process goes to Step 908. When the rotational synchronization control phase is set, the process goes to Step 904. When the rotational synchronization control phase is not set, at Step 908, the power train control unit 100 sets first assist torque TTa1=0, sets "second assist torque TTa2=target assist torque TTa", and finishes the process.

When the rotational synchronization control phase is set, at Step 904, the power train control unit 100 judges whether the distribution start flag fSCHGST is 1 or not. When it is not 1, the power train control unit 100 performs the process at Step 905, and when it is 1, the process goes to Step 906.

When the distribution start flag fSCHGST is 1, at Step 906, the power train control unit 100 performs the distribution of the target assist torque TTa to change-from synchromesh to sychromesh (change the transfer torque gear to gear). The power train control unit 100 calculates the distribution rate Kshr as a function g2 of (distribution counter Tm_chg÷torque distribution time SHRMX). Further, the power train control unit 100 sets "first assist torque TTa2=assist torque before distribution start TTa0×distribution rate Kshr". And the control unit 100 gradually changes the first assist torque TTa1 on a feedforward, in correspondence with the change of the distribution rate Kshr, with the assist torque before distribution start TTa0 as starting point. Furthermore, the power train control unit 100 sets "second assist torque TTa2=(target assist torque TTa−first assist torque TTa1)". Therefore, the feedback control for the target assist torque shown in FIG. 7 is performed mainly by the second assist torque TTa2. Here, (distribution counter Tm_chg÷torque distribution time SHRMX) is a parameter gradually changing from 1 to 0, and the distribution rate Kshr is also a parameter gradually changing from 1 to 0. A concrete example of distribution of the target assist torque TTa will be described later, for example, by referring to FIGS. 11(D) and 11(F).

Finally, at Step 907, the power train control unit 10 decrements the distribution counter Tm_chg and finishes the process.

Here, the functions g1 at Step 905 is desirably set so as to shorten the torque distribution time SHRMAX when the accelerator opening Aps is small, and so as to prolong the torque distribution time SHRMAX when the accelerator opening Aps is large. Further, in place of the accelerator opening, the control unit 100 may calculate the torque required by a driver on the basis of the accelerator opening and speed, and calculate the torque distribution time SHRMAX by using the required torque.

Further, the function g2 is set so as to meet the following conditions: when (distribution counter Tm_chg÷torque distribution time SHRMX) is 1, the distribution rate Kshr also becomes 1; and when (distribution counter Tm_chg÷torque distribution time SHRMX) is 0, the distribution rate Kshr also becomes to 0. The area of 0<(Tm_chg÷SHRMX)<1 may be set so that as (Tm_chg÷SHRMX) gradually changes from 1 to 0, Kshr also gradually changes from 1 to 0, preferably is set so that a one-to-one correspondence is obtained between them.

Further, in place of the process at Step 906, even if TTa2=(TTa×Kshr) and TTa2=(TTa×(1−Kshr)) are set, the target assist torque can be distributed to two synchromeshes. In this case, depending on the difference in the response between the synchromesh realizing TTa1 and the synchromesh realizing TTa2, there is a possibility that hunting of the input shaft speed occurs. Therefore, as Step 906 shown in FIG. 9, as for the control apparatus, it is better to constitute so that one side of the synchromeshes performs feedforward control and the other side performs feedback control.

Next, Step 505 (the target motor torque operation) shown in FIG. 5 will be explained in detail by referring to FIG. 10.

Figure 10:
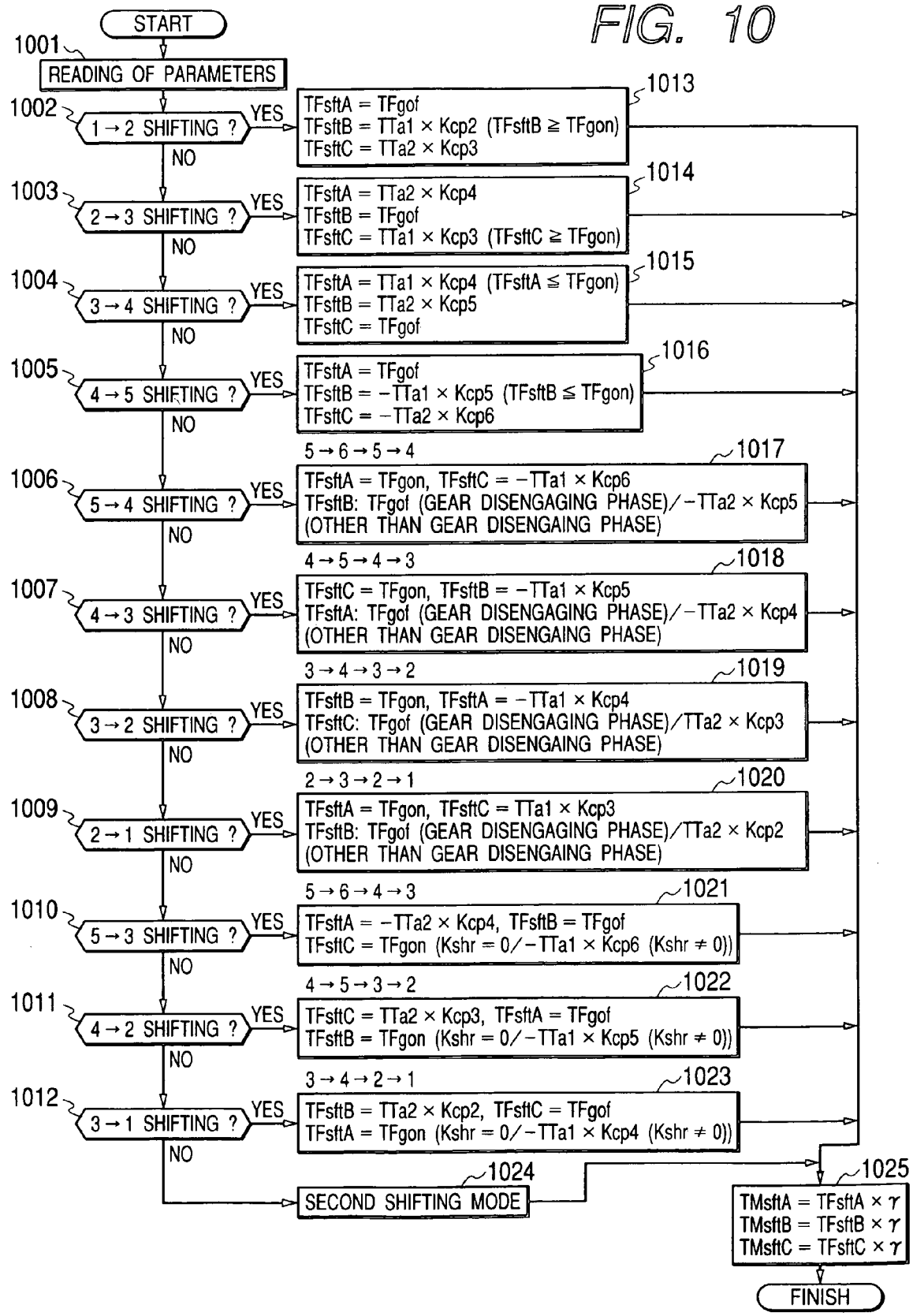
FIG. 10 is a flow chart showing the processing contents of the target motor torque operation of the control apparatus of the automatic transmission of an embodiment of the present invention.

FIG. 10 is a flow chart showing the processing contents of the target motor torque operation of the control apparatus of the automatic transmission of the embodiment.

Here, the first synchromesh 21 moves in the axial direction of the input shaft 41 of the transmission, so that for convenience, the target pressing load of the sleeve provided in the first synchromesh 21 is defined as "shift A target load TFsftA". And the target torque of the motor 112 for realizing the shift A target load TFsftA is defined as "shift A motor target torque TMsftA". Further the moving direction and loading direction of the sleeve are defined as indicated below. Similarly, the target pressing load of the sleeve provided in the second synchromesh 22 is defined as "shift B target load TFsftB". And the target torque of the motor 113 for realizing the shift B target load TFsftB is defined as "shift B motor target torque TMsftB". The target pressing load of the sleeve provided in the second synchromesh 23 is defined as "shift C target load TFsftC". And the target torque of the motor 114 for realizing the shift C target load TFsftC is defined as "shift C motor target torque TMsftC". The moving direction and loading direction of the sleeve are also defined as indicated below.

When the first synchromesh 21 is to be pressed toward the first drive gear 1, or when the second synchromesh 22 is to be pressed toward the second drive gear 2, or when the third synchromesh 23 is to be pressed toward the third drive gear 3, the signs of each shift target load and each shift motor torque are set to positive. When the first synchromesh 21 is to be pressed toward the fourth drive gear 4, or when the second synchromesh 22 is to be pressed toward the fifth drive gear 5, or when the third synchromesh 23 is to be pressed toward the sixth drive gear 6, the signs of each shift target load and each shift motor torque are set to negative.

Further, in the following explanation, shifting from the 1st gear position to the 2nd gear-position is stated as 1-2 shifting and, shifting from the 3rd gear position to the 2nd gear position is stated as 3-2 shifting, or the like.

At Step 1001, the power train control unit 100 reads the parameters used at Steps 1002 to 1025.

Next, at Step 1002, the power train control unit 100 judges whether the apparatus is during 1-2 shifting or not, and when the apparatus is not during 1-2 shifting, the process goes to Step 1003, and when the apparatus is during 1-2 shifting, the process goes to Step 1013. At Step 1013, the power train control unit 100 sets "shift A target load TFsftA=gear disengaging necessary load TFgof". Further, the power train control unit 100 calculates "shift B target load TFsftB" using "TFsftB=TTa1×Kcp2" from the first assist torque TTa1 set at Step 905 or Step 906 and the coefficient Kcp2. However, the power train control unit 100 restricts the lower limit of the shift B target load TFsftB by a gear engaging necessary load TFgon. Here, the coefficient Kcp2 is a coefficient for converting the transfer torque between the second synchromesh 22 and the second drive gear 2 to a pressing load, and is calculated from the effective radius and friction coefficient of the cone face of the esynchromeshs and the number of cone faces. Furthermore, the power train control unit 100 calculates "shift C target load TFsftC" using "TFsftC=TTa2×Kcp3" from the second assist torque TTa2 set at Step 905 or Step 906 and the coefficient Kcp3. Here, the coefficient Kcp3 is a coefficient for converting the transfer torque between the third synchromesh 23 and the third drive gear 3 to a pressing load.

When the apparatus is not during 1-2 shifting, at Step 1003, the power train control unit 100 judges whether the apparatus is during 2-3 shifting, and when the apparatus is not during 2-3 shifting, the process goes to Step 1004, and when the apparatus is during 2-3 shifting, the process goes to Step 1014. At Step 1014, the power train control unit 100 calculates "shift A target load TFsftA" from "TFsftA=−TTa2×Kcp4". Here, the coefficient Kcp4 is a coefficient for converting the transfer torque between the first synchromesh 21 and the fourth drive gear 4 to a pressing load. Further, the power train control unit 100 sets "shift B target load TFsftB=gear disengaging necessary load TFgof" and calculates "shift C target load TFsftC" from "TFsftC=TTa1×Kcp3". However, the power train control unit 100 restricts the lower limit of the shift C target load TFsftC by the gear engaging necessary load TFgon.

When the apparatus is not during 2-3 shifting, at Step 1004, the power train control unit 100 judges whether the apparatus is during 3-4 shifting, and when the apparatus is not during 3-4 shifting, the process goes to Step 1005, and when the apparatus is during 3-4 shifting, the process goes to Step 1015. At Step 1015, the power train control unit 100 calculates "shift A target load TFsftA" from "TFsftA=−TTa1×Kcp4". However, the power train control unit 100 restricts the upper limit of the shift A target load TFsftA by the gear engaging necessary load TFgon. Further, the power train control unit 100 calculates "shift B target load TFsftB" from "TFsftB=−TTa2×Kcp5". Here, the coefficient Kcp5 is a coefficient for converting the transfer torque between the second synchromesh 22 and the fifth drive gear 5 to a pressing load. Furthermore, the power train control unit 100 sets "shift C target load TFsftC=gear disengaging necessary load TFgof".

When the apparatus is not during 3-4 shifting, at Step 1005, the power train control unit 100 judges whether the apparatus is during 4-5 shifting, and when the apparatus is not during 4-5 shifting, the process goes to Step 1006, and when the apparatus is during 4-5 shifting, the process goes to Step 1016. At Step 1016, the power train control unit 100 sets "shift A target load TFsftA=gear disengaging necessary load TFgof", and calculates "shift B target load TFsftB" from "TFsftB=−TTa1×Kcp5". However, the power train control unit 100 restricts the upper limit of the shift B target load TFsftB by the gear engaging necessary load TFgon. Further, the power train control unit 100 calculates the "shift C target load TFsftC" from "TFsftC=−TTa2×Kcp6". Here, the coefficient Kcp6 is a coefficient for converting the transfer torque between the third synchromesh 23 and the sixth drive gear 6 to a pressing load.

When the apparatus is not during 4-5 shifting, at Step 1006, the power train control unit 100 judges whether the apparatus is during 5-4 shifting, and when the apparatus is not during 5-4 shifting, the process goes to Step 1007, and when the apparatus is during 5-4 shifting, the process goes to Step 1017. At Step 1017, the power train control unit 100 sets "shift A target load TFsftA=gear engaging necessary load TFgon". The shift C target load TFsftC is set to "TFsftC=−TTa1×Kcp6". Further when the gear disengaging phase is set, the shift B target load TFsftB is set to "gear disengaging necessary load TFgof", when a phase other than the gear disengaging phase is set, TFsftB is set to (−TTa2× Kcp5).

When the apparatus is not during 5-4 shifting, at Step 1007, the power train control unit 100 judges whether the apparatus is during 4-3 shifting, and when the apparatus is not during 4-3 shifting, the process goes to Step 1008, and when the apparatus is during 4-3 shifting, the process goes to Step 1018. At Step 1018, the power train control unit 100 sets "shift C target load TFsftC=gear engaging necessary load TFgon". The shift B target load TFsftB is set to "TFsftB=−TTa1×Kcp5". Further when the gear disengaging phase is set, the shift A target load TFsftA is set to "gear disengaging necessary load TFgof", when a phase other than the gear disengaging phase is set, TFsftA is set to (−TTa2×Kcp4).

When the apparatus is not during 4-3 shifting, at Step 1008, the power train control unit 100 judges whether the apparatus is during 3-2 shifting, and when the apparatus is not during 3-2 shifting, the process goes to Step 1009, and when the apparatus is during 3-2 shifting, the process goes to Step 1019. At Step 1019, the power train control unit 100 sets "shift B target load TFsftB=gear engaging necessary load TFgon". The shift C target load TFsftA is set "TFsftA=−TTa1×Kcp4". Further when the gear disengaging phase is set, the shiftC target load TFsftC is set to "gear disengaging necessary load TFgof", when a phase other than the gear disengaging phase is set, TFsftC is set to (TTa2×Kcp3).

When the apparatus is not during 3-2 shifting, at Step 1009, the power train control unit 100 judges whether the apparatus is during 2-1 shifting, and when the apparatus is not during 2-1 shifting, the process goes to Step 1010, and when the apparatus is during 2-1 shifting, the process goes to Step 1020. At Step 1020, the power train control unit 100 sets "shift A target load TFsftA=gear engaging necessary load TFgon". The shift C target load TFsftC is set "TFsftC=TTa1×Kcp3". Further when the gear disengaging phase is set, the shift B target load TFsftB is set to "gear disengaging necessary load TFgof", when a phase other than the gear disengaging phase is set, TFsftB is set to (TTa2×Kcp2).

When the apparatus is not during 2-1 shifting, at Step 1010, the power train control unit 100 judges whether the apparatus is during 5-3 shifting, and when the apparatus is not during 5-3 shifting, the process goes to Step 1011, and when the apparatus is during 5-3 shifting, the process goes to Step 1021. At Step 1021, the power train control unit 100 sets "shift A target load TFsftA=−TTa2×Kcp4", and "shift B target load TFsftB=gear disengaging necessary load TFgof". The shift C target load TFsftC, when the distribution rate Kshr set in FIG. 9 is 0, is set to "gear engaging load TFgon", and when the distribution rate Kshr is not 0, to (−TTa1×Kcp6).

When the apparatus is not during 2-1 shifting, at Step 1011, the power train control unit 100 judges whether the apparatus is during 4-2 shifting, and when the apparatus is not during 4-2 shifting, the process goes to Step 1012, and when the apparatus is during 4-2 shifting, the process goes to Step 1022. At Step 1022, the power train control unit 100 sets "shift C target load TFsftC=TTa2×Kcp3" and "shift A target load TFsftA=gear disengaging necessary load TFgof". The shift B target load TFsftB, when the distribution rate Kshr set in FIG. 9 is 0, is set to "gear engaging load TFgon", and when the distribution rate Kshr is not 0, to (−TTa1×Kcp5).

When the apparatus is not during 4-2 shifting, at Step 1012, the power train control unit 100 judges whether the apparatus is during 3-1 shifting, and when the apparatus is not during 3-1 shifting, the process goes to Step 1024, and when the apparatus is during 3-1 shifting, the process goes to Step 1023. At Step 1023, the power train control unit 100 sets "shift B target load TFsftB=TTa2×Kcp2" and "shift C target load TFsftC=gear disengaging necessary load TFgof". The shift A target load TFsftA, when the distribution rate Kshr set in FIG. 9 is 0, is set to "gear engaging load TFgon", and when the distribution rate Kshr is not 0, to (−TTa1×Kcp4).

When the apparatus is not during 3-1 shifting, at Step 1024, the power train control unit 100 disengages the input shaft clutch 8, and performs the second shifting mode for the shifting.

Finally, the power train control unit 100 multiplies the shift A target load TFsftA by the conversion coefficient γ to convert to the shift A motor target torque TMsftA. Further, the power train control unit 100 multiplies the shift B target load TFsftB by the conversion coefficient γ to convert to the shift B motor target torque TMsftB. Furthermore, the power train control unit 100 multiplies the shift C target load TFsftC by the conversion coefficient γ to convert to the shift C motor target torque TMsftC. Here, the conversion coefficient γ is a conversion coefficient of the machinery for converting the rotary motion of the motor of each of the shift A actuator 112, the shift B actuator 113, and the shift C actuator 114 to linear motion.

Next, a first shift control example of the control apparatus of the automatic transmission of this embodiment will be explained by referring to FIG. 11. The first shift control example indicates the control contents at the time of up-shift from the 1st gear position to the 2nd gear position.

Figure 11:
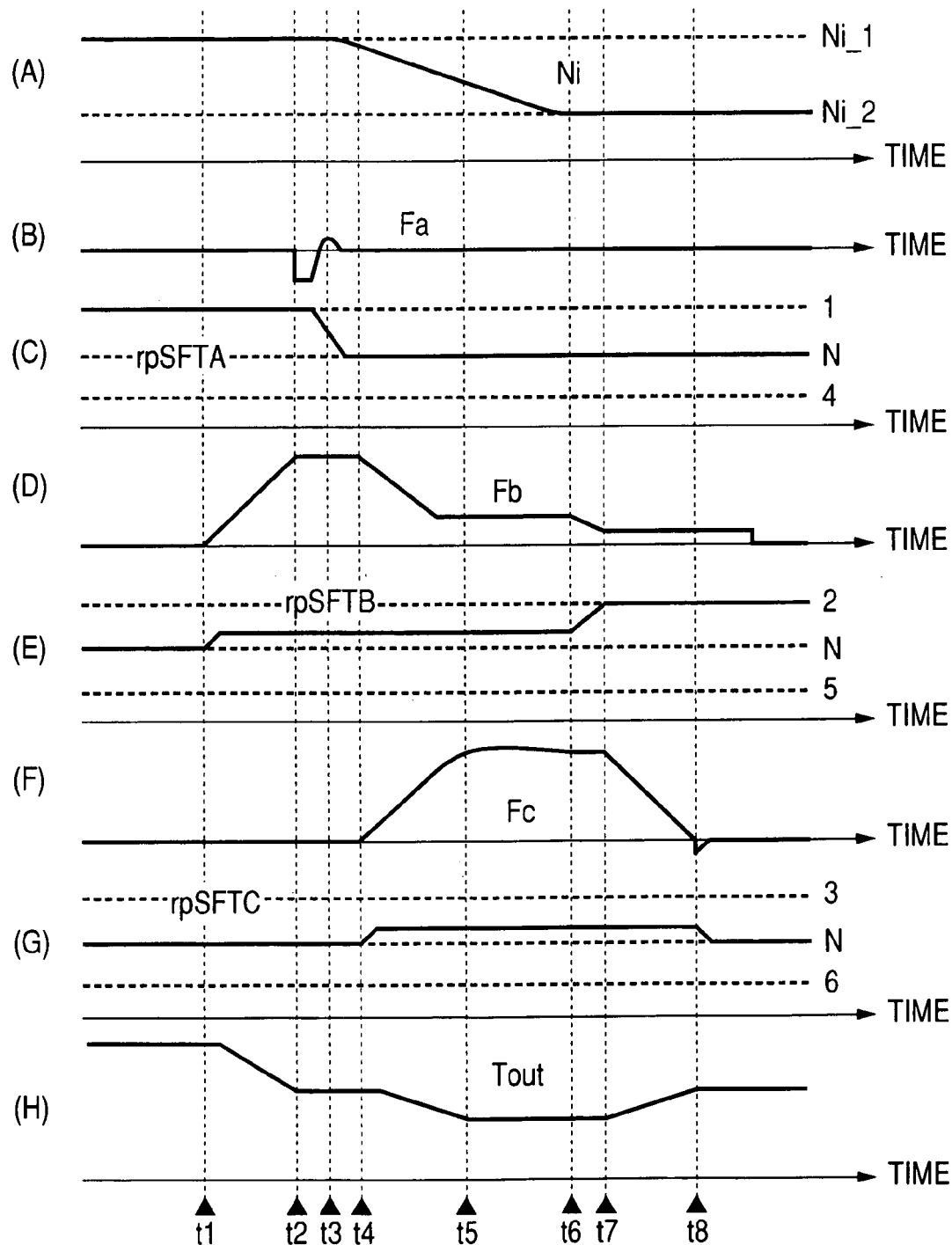
FIG. 11 is a time chart showing a first shift control example of the control apparatus of the automatic transmission of an embodiment of the present invention.

FIG. 11 is a time chart showing the first shift control example of the control apparatus of the automatic transmission of an embodiment of the present invention.

In FIG. 11, the period from the time t1 to the time t3 is the disengaging control phase (Step 403 shown in FIG. 9), and the period from the time t3 to the time t6 is the rotational synchronization control phase (Step 405 shown in FIG. 9), and the period from the time t6 to the time t7 is the engaging control phase (Step 407 shown in FIG. 9), and the period from the time t7 to the time t8 is the shifting end phase (Step. 409 shown in FIG. 9).

In FIG. 11, FIG. 11(A) shows the input shaft speed Ni. Ni_1 indicates the speed corresponding to the 1st gear position and Ni_2 indicates the speed corresponding to the 2nd gear position.

FIG. 11(B) shows a shift A load Fa which is a pressing load of the first synchromesh 21. The shift A load Fa is calculated from "shift A target load TFsftA=gear disengaging necessary load TFgof "at Step 1013 shown in FIG. 10. FIG. 11(C) indicates a shift A stroke position rpSFTA of the first synchromesh 21 capable of selecting the 1st gear position and 4th gear position.

FIG. 11(D) shows a shift B load Fb which is a pressing load of the second synchromesh 22. The shift B load Fb is calculated from "shift B target load TFsftB=TTa1×Kcp2" at Step 1013 shown in FIG. 10. FIG. 11(E) indicates a shift B stroke position rpSFTB of the second synchromesh 22 capable of selecting the 2nd gear position and 5th gear position.

FIG. 11(F) shows a shift C load Fc which is a pressing load of the third synchromesh 23. The shift B load Fc is calculated from "shift C target load TFsftC=TTa2×Kcp3 at Step 1013" shown in FIG. 10. FIG. 11(G) indicates "shift C stroke position rpSFTC" of the third synchromesh 23 capable of selecting the 3rd gear position and 6th gear position. FIG. 11(H) indicates transmission output shaft torque Tout.

In this example, at the time of up-shift from the 1st gear position to the 2nd gear position, the torque is transferred halfway using the 2nd gear position (one distribution gear) and 3rd gear position (another distribution gear). In short, at the time of 1-2 shifting, the torque is transferred in order of 1st gear, 2nd gear, 3rd gear and 2nd gear. When disengaging the synchromesh 21 of the 1st gear position, at least one part of the rotation torque of the drive power source is transferred by the synchromesh 22 of the 2nd gear position having a smaller reduction ratio than the 1st gear position. Thus the synchromesh 21 of the 1st gear position is moved to the disengaging position not meshed with the idle gear. Further, when making the synchromesh 22 of the 2nd gear position mesh with the corresponding idle gear, at least one part of the rotation torque of the drive power source is transferred by the synchromesh of the 3rd gear position having a smaller reduction ratio than the 2nd gear position, and simultaneously the synchromesh 22 of the 2nd gear position is moved to the meshing position.

Further, in this example, the function g2 at Step 906 shown in FIG. 9 is set to a one-to-one correspondence. Namely, the function is set so that when the distribution rate Kshr (distribution counter Tm_chg÷torque distribution time SHRMX) is equal to g2, the distribution rate Kshr is changed linearly to "distribution counter Tm_chg÷torque distribution time SHRMX".

Prior to the time t1, as shown in FIG. 11(C), the shift A stroke position rpSFTA is the "1st gear" position and is kept in the 1st gear position. At this time, as shown in FIG. 11(A), the input shaft speed Ni is the speed Ni_1 corresponding to the 1st gear position.

When shifting start is judged by the decision process at Step 402 shown in FIG. 4, the shifting is started. Here, at the time t1, the shifting is started. When the shifting is started at the time t1, the power train control unit 100, in the disengaging control phase, disengages the 1st gear and simultaneously transfers the torque in the 2nd gear position.

At Step 703 shown in FIG. 7, the disengaging control phase is judged to be set, so that at Step 707, the power train control unit 100 slowly brings the target assist torque feedforward value TTaFF from 0 to the engine torque Te. On the basis of the target assist torque feedforward value TTaFF, the power train control unit 100 calculates the target assist torque TTa at Steps 712 and 713. Further, in the disengaging control phase, on the basis of the judgment at Step 902 shown in FIG. 9, the power train control unit 100 sets "first assist torque TTa1=target assist torque TTa". As a result, as shown in FIG. 11(D), the shift B load Fb is started up at the time t1.

At the time t2 when the shift B load Fb is sufficiently started up, to disengage the 1st gear, as shown in FIG. 11(B), the power train control unit 100 starts up the shift A load Fa and as shown in FIG. 11(C), the shift A stroke position rpSFTA starts moving from the 1st gear position to the neutral position and the 1st gear is disengaged.

At the time t3, when the shift A stroke position rpSFTA shown in FIG. 11(C) is dislocated from the meshing position, the rotational synchronization control phase (the process at Step 405 shown in FIG. 4) is set.

In the rotational synchronization control phase, by the process at Step 602 shown in FIG. 6, as shown in FIG. 11(A), so as to gradually change the speed Ni_1 in the 1st gear position before shifting to the speed Ni_2 in the 2nd gear position after shifting, the power train control unit 100 sets the target input shaft speed TNi. Therefore, in the rotational synchronization control phase, by the shift B load Fb shown in FIG. 11(D) and the shift C load Fc shown in FIG. 11(F), the power train control unit 100 synchronizes the input speed (A) with the speed Ni_2 corresponding to the 2nd gear position from the speed Ni_1 corresponding to the 1st gear position.

The power train control unit 100 starts the change of the assist torque from gear to gear at the time t4 shown in FIG. 11, and the start timing thereof (the time t4) is decided as indicated below. Since the shifting is up-shift from the 1st gear position to the 2nd gear position, the judgment at Step 806 shown in FIG. 8 is performed, and the process goes to Step 811. At step 811, when the continuation time TMPH2 of the rotational synchronization phase is not shorter than the 3rd gear distribution start time TMCHG3, the control unit 100 sets the distribution start flag fSCHGST to 1. The continuation time TMPH2 of the rotational synchronization phase, as shown in FIG. 11, is the elapsed time since the time t3. Therefore, when the 3rd gear distribution start time TMCHG3 elapses after the time t3, the distribution start flag fSCHGST is set to 1 and the control unit 100 starts the change of the assist torque from gear to gear.

In the rotational synchronization control phase, from the time t4 to the time t5, the control unit 100 performs the distribution of the assist torque (the change of the assist torque from gear to gear). In the rotational synchronization phase, when the distribution start flag sSCHGST is set at 1, the judgments of at Steps 903 and 904 shown in FIG. 9 is performed, and the process goes to Step 906. At Step 906, (distribution counter Tm_chg÷torque distribution time SHRMX) is a parameter gradually changing from 1 to 0, and the distribution rate Kshr is also a parameter gradually changing from 1 to 0. Here, as mentioned above, the function g2 is set to be linearly changed, so that the distribution rate Kshr is linearly decreased from 1 to 0. The first assist torque TTa1 is "assist torque before distribution start TTa0×distribution rate Kshr", so that it is linearly decreased from "assist torque before distribution start TTa0". Furthermore, by the process at Step 1013 shown in FIG. 10, "shift B target load TFsftB" is calculated by first assist torque TTa1×Kcp2, so that as shown in FIG. 11(D), "shift B load Fb" is gradually decreased at a constant slope with the shift B load as starting point.

On the other hand, by the process at Step 906, the second assist torque TTa2 is set as (target assist torque TTa−first assist torque TTa1). Therefore, the second assist torque TTa2 is gradually increased from 0. Furthermore, by the process at Step 1013 shown in FIG. 10, the shift C target load TFsftC is calculated by "second assist torque TTa2×Kcp3", so that as shown in FIG. 11(F), "shift C load Fc" is increased gradually. Here, the target assist torque TTa, as explained at Step 713 shown in FIG. 7, is a summed value of the feedforward value TTaFF and the feedback value TTaFB, so that it ichanges according to changing of the feedback value TTaFB. The second assist torque TTa2 is set as (target assist torque TTa−first assist torque TTa1), so that the feedback value TTaFB changing under the feedback control of the target assist torque is changed mainly by the second assist torque TTa2, that is, the shift C load Fc. Therefore, as shown in FIG. 11(D), the shift B load Fc is linearly decreased at a constant slope, while, as shown in FIG. 11(F), the shift C load Fc is gradually increased not linearly including the change of the feedback value TTaFB. Further, in the rotational synchronization phase, by the process at Step 708 shown in FIG. 7, the feedforward value TTaFF is set as (engine torque Te—inertial torque TTina). The inertial torque TTina is a value obtained at Step 604.

As mentioned above, from the time t4 to the time t6, the adjustment under the feedback control for synchronizing the input shaft speed Ni (FIG. 11(A)) with the speed Ni_2 corresponding to the 2nd gear position is made mainly by the shift C load Fc (FIG. 11(F)).

At the time t6 shown in FIG. 11, at the point of time when the speed is synchronized, completion of the synchronization control is judged by the judgement at Step 406 shown in FIG. 4,and the process goes to the gear engaging phase at Step 407.

In the gear engaging phase, as shown in FIG. 11(E), the shift B position rpSFTB moves to the 2nd gear meshing position (2). At the time t7 shown in FIG. 11, at the point of time when the shift B position rpSFTB (FIG. 11(E)) moves to the 2nd gear meshing position, end of the engaging control is judged by the judgment at Step 408 shown in FIG. 4, and the process goes to the shifting end phase at Step 409.

In the shifting end phase, by the process at Step 710 shown in FIG. 7, the control unit 100 performs the process of gradually bringing the target assist torque feedforward value TTaFF to 0 from the engine torque Te, thus as shown in FIG. 11(F), the shift C load Fc is gradually decreased to 0. At the time t8 when the shift C load Fc is decreased to 0, end of the shift control is judged by the judgment at Step 410 shown in FIG. 4.

By use of such a constitution, as shown in FIG. 11(H), the transmission output shaft torque Tout is smoothly changed from the one corresponding to the 1st gear to the one corresponding to the 2nd gear (t1–t2), from the one corresponding to the 2nd gear to the one corresponding to the 3rd gear (t4–t6), and from the one corresponding to the 3rd gear to the one corresponding to the 2nd gear (t7–t8). Thereby shifting having good operation performance (shift quality) can be realized.

Further, in the change from the pressing load (transfer torque) of the synchromesh corresponding to the 2nd gear to the one corresponding to the 3rd gear (from the time t4 to the time t5 during the rotational synchronization), as shown in FIG. 11(D), with "shift B load" at the start time of the change of the transfer torque from gear to gear as starting point, the shift B load Fb is gradually decreased at a constant slope on a feedforward basis. In addition to that, as shown in FIG. 11(F), the shift C load Fc is gradually increased, and the feedback control is performed by the shift C load Fc. Thus, an occurrence of a shock due to the change of the pressing load of synchromesh from gear to gear can be avoided, and shifting of good feeling can be realized.

Next, a second shift control example of of the embodiment will be explained by referring to FIG. 12. The second shift control example indicates the control contents at the time of up-shift from the 2nd gear position to the 3rd gear position.

Figure 12:
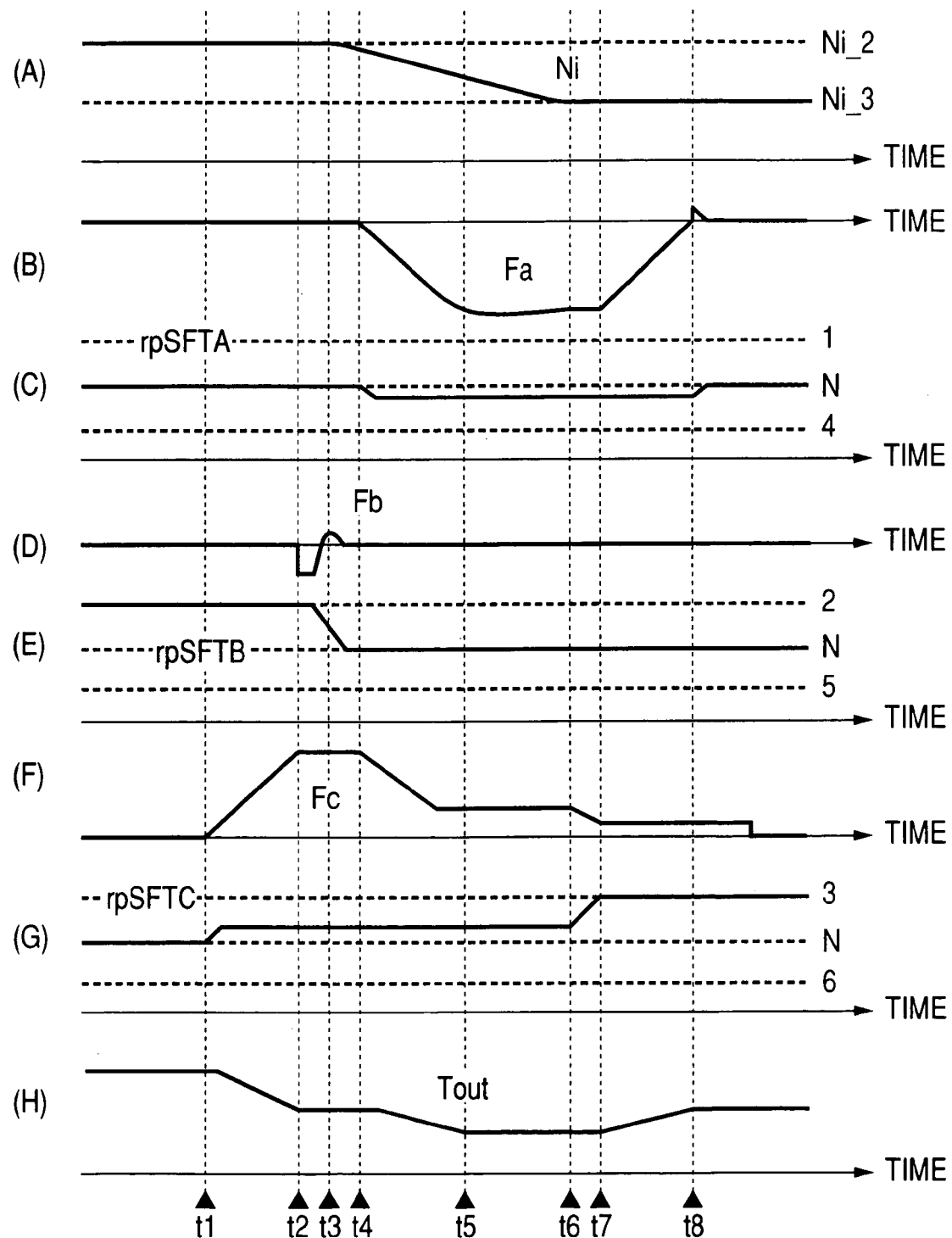
FIG. 12 is a time chart showing a second shift control example of the control apparatus of the automatic transmission of an embodiment of the present invention.

FIG. 12 is a time chart showing the second shift control example. In FIG. 12, the time of the axis of abscissa is the same as that shown in FIG. 11. Further, FIGS. 12(A) to 12(H) are the same as FIGS. 11(A) to 11(H).

In this example, at the time of up-shift from the 2nd gear position to the 3rd gear position, the torque is transferred halfway using the 3rd gear position and 4th gear position. In short, at the time of 2-3 shifting, the torque is transferred in order of 2nd gear, 3rd gear, 4th gear, and 3rd gear. Further, in this example, in the same as with FIG. 11,the function g2 at Step 906 shown in FIG. 9 is set in a one-to-one correspondence.

Prior to the time t1, as shown in FIG. 12(E), the shift B stroke position rpSFTB is the "2nd gear" position and is kept in the 2nd gear position. At this time, as shown in FIG. 12(A), the input shaft speed Ni is the speed Ni_2 corresponding to the 2nd gear position.

When shifting start is judged by the process of judgment at Step 402 shown in FIG. 4, the shifting is started. When the shifting is started at the time t1, as shown in FIG. 12(F), the control unit 100 starts up "shift C load Fc" in the disengaging control phase. At the time t2 when the shift C load Fc is sufficiently started up, the 2nd gear is disengaged, as shown in FIG. 12(D), the control unit 100 starts up "shift B load Fb". Then, as shown in FIG. 12(E), "shift B stroke position fpSFTB" starts moving to the neutral position, and the 2nd gear is disengaged. At the time t3, as shown in FIG. 12(E), when the shift B stroke position is dislocated from the meshing position, the rotational synchronization control phase is set.

In the rotational synchronization control phase, by the shift A load Fa and the shift C load Fc, the input speed Ni is synchronized with the speed Ni_3 corresponding to the 3rd gear position from the speed Ni_2 corresponding to the 2nd gear position. In the rotational synchronization phase, from the time t4 to the time t5, the assist torque is distributed. With the shift C load Fc at the time t4 as starting point, as shown in FIG. 12(F), the shift C load Fc is gradually decreased at a constant slope, and simultaneously, as shown in FIG. 12(B), the shift A load Fa is gradually increased. From the time t4 to the time t6, the adjustment under the feedback control for synchronizing the input shaft speed Ni with the speed Ni_3 corresponding to the 3rd gear position is made mainly by the shift A load Fa. At the time t6 when the speed is synchronized, the gear engaging phase is set, and as shown in FIG. 12(G), "shift C position rpSFTC" moves to the 3rd gear meshing position. At the time t7 when the shift C position rpSFTC moves to the 3rd gear meshing position, the shifting end phase is set. In the shifting end phase, as shown in FIG. 12(B), at the time t8 when the shift A load Fa is gradually decreased and becomes 0, the shift control is finished.

By use of such a constitution, the transmission output shaft torque is smoothly changed from the one corresponding to the 2nd gear to the one corresponding to the 3rd gear, from the one corresponding to the 3rd gear to the one corresponding to the 4th gear, and from the one corresponding to the 4th gear to the one corresponding to the 3rd gear, thereby shifting having good operation performance (shift quality) can be realized.

Further, in the change from the pressing load (transfer torque) of the synchromesh corresponding to the 3rd gear to the one corresponding to the 4th gear (from the time t4 to the time t5 during the rotational synchronization), with "shift C load" at the start time of the change of the transfer torque from gear to gear as starting point, the shift C load Fc is gradually decreased at a constant slope on a feedforward basis. And the shift A load Fa is gradually increased, and the feedback control is performed by the shift A load Fa. Thus, an occurrence of a shock due to the change of pressing load of the synchromesh from gear to gear can be avoided, and shifting of good feeling can be realized.

Next, a third shift control example of the embodiment will be explained by referring to FIG. 13. The third shift control example, in the same way as with the first shift control example, indicates the control contents at the time of up-shift from the 1st gear position to the 2nd gear position.

Figure 13:
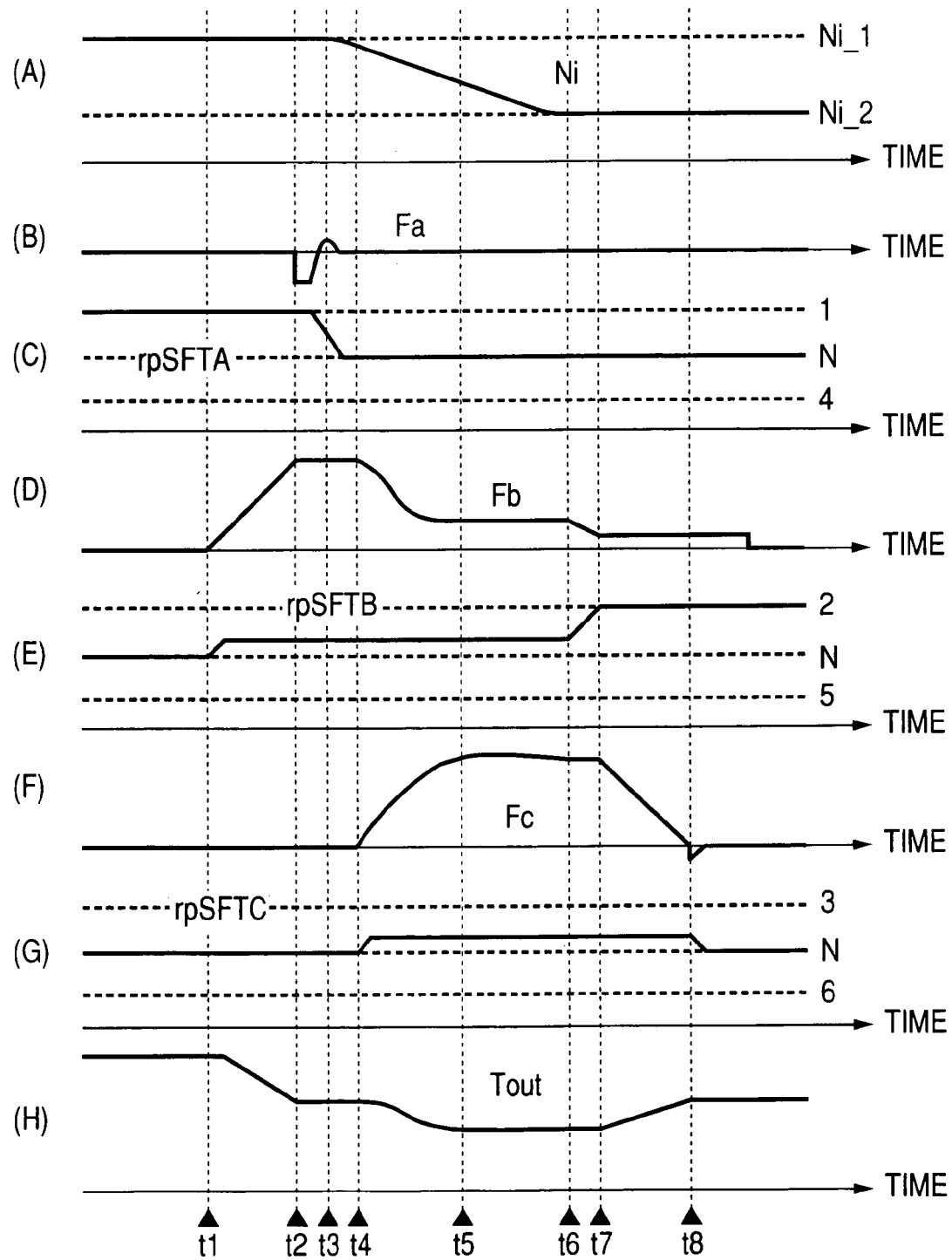
FIG. 13 is a time chart showing a third shift control example of the control apparatus of the automatic transmission of an embodiment of the present invention.

FIG. 13 is a time chart showing the third shift control example of the embodiment. In FIG. 13, the time of the axis of abscissa is the same as that shown in FIG. 11. Further, FIGS. 13(A) to 13(H) are the same as FIGS. 11(A) to 11(H).

Further, in this example, the function g2 at Step 906 shown in FIG. 9 is set so as to have many inflexion points instead of a one-to-one correspondence. Namely, when "distribution rate Kshr=g2 (distribution counter Tm_chg÷torque distribution time SHRMX)", the distribution rate Kshr is set so as to change not linearly to (distribution counter Tm_chg÷torque distribution time SHRMX) but to change to have many inflexion points like a secondary function or a cubic function.

The basic operation is the same as that shown in FIG. 11. The different point is the changes of the shift B load Fb (FIG.

13(D)) and the shift C load Fc (FIG. 13(F)) from the time t4 to the time t5. Namely, from the time t4 to the time t5, the control unit 100 distributes the assist torque, though with "shift B load" at the time t4 as starting point, as shown in FIG. 13(D), it gradually decreases the shift B load Fb at a predetermined slope (the slope of the function g2), and as shown in FIG. 13(F), gradually increases the shift C load Fc. From the time t4 to the time t6, in the same way as with FIG. 11, the adjustment under the feedback control for synchronizing the input shaft speed Ni with the speed Ni_2 corresponding to the 2nd gear position is made mainly by the shift C load Fc.

By use of such a constitution, the transmission output shaft torque is smoothly changed from the one corresponding to the 1st gear to the one corresponding to the 2nd gear, from the one corresponding to the 2nd gear to the one corresponding to the 3rd gear, and from the one corresponding to the 3rd gear to the one corresponding to the 2nd gear, and shifting having good operation performance (shift quality) can be realized.

Further, in the change from the pressing load (transfer torque) of the synchromesh corresponding to the 2nd gear to the one corresponding to the 3rd gear (from the time t4 to the time t5 during the rotational synchronization), with "shift B load" at the start time of replacement as starting point, the shift B load Fb is gradually decreased on a feedforward basis according to the setting of the function g2, and the shift C load Fc is gradually increased. And the feedback control is performed by the shift C load Fc. Thus, an occurrence of a shock due to the change of the pressing load of the synchromesh from gear to gear can be avoided, and shifting of good feeling can be realized.

Next, a fourth shift control example of the embodiment will be explained by referring to FIG. 14. The fourth shift control example indicates the control contents at the time of down-shift from the 2nd gear position to the 1st gear position.

Figure 14:
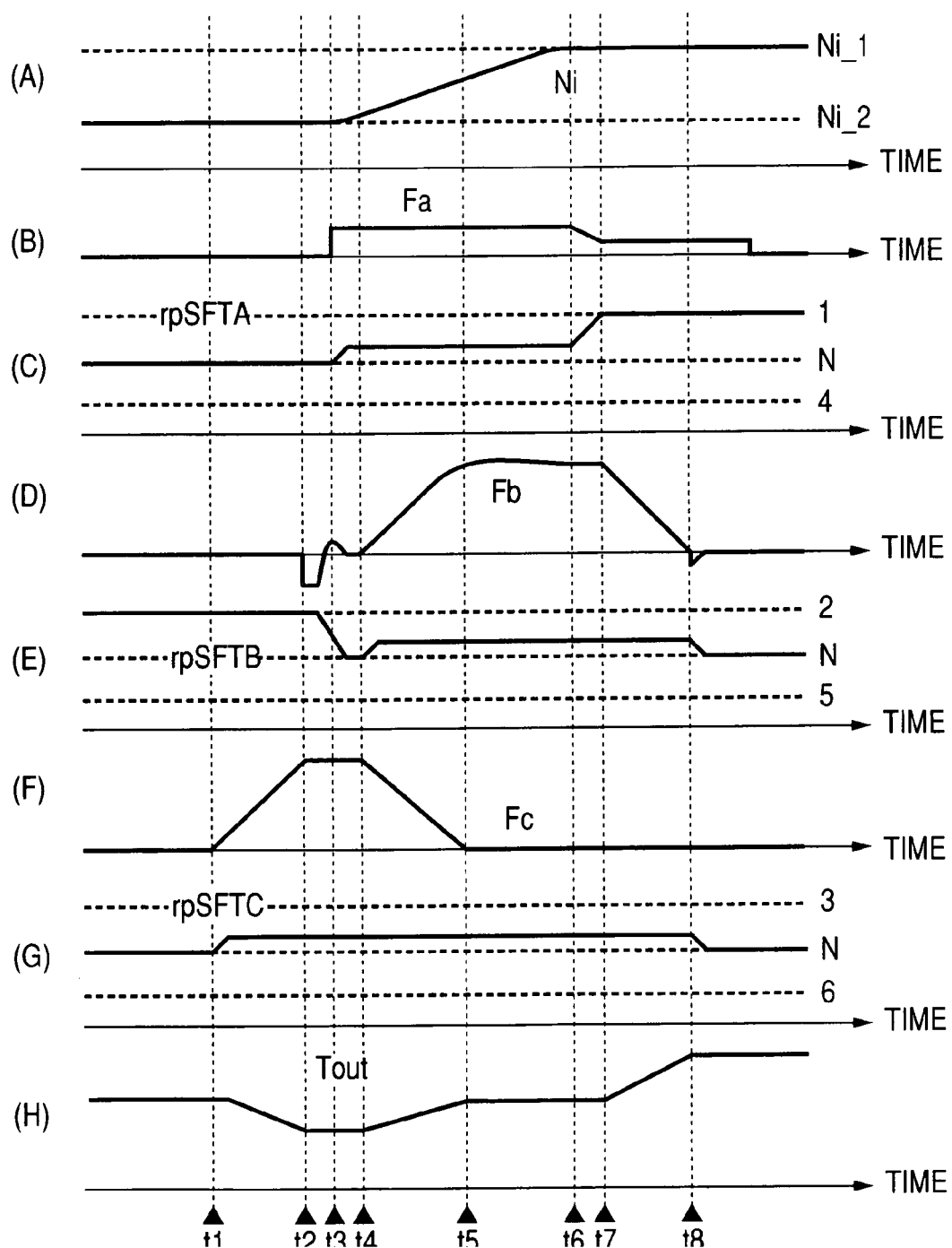
FIG. 14 is a time chart showing a fourth shift control example of the control apparatus of the automatic transmission of an embodiment of the present invention.

FIG. 14 is a time chart showing the fourth shift control example of the embodiment. In FIG. 14, the time of the axis of abscissa is the same as that shown in FIG. 11. Further, FIGS. 14(A) to 14(H) are the same as FIGS. 11(A) to 11(H).

In this example, at the time of down-shift from the 2nd gear position to the 1st gear position, the torque is transferred halfway using the 3rd gear position and 2nd gear position. In short, at the time of 2-1 shifting, the torque is transferred in order of 2nd gear, 3rd gear, 2nd gear and 1st gear. Further, in this example, in the same way as with FIG. 11, the function g2 at Step 906 shown in FIG. 9 is set to a one-to-one correspondence.

When the shifting is started at the time t1, in the disengaging control phase, as shown in FIG. 14(F), the control unit 100 starts up the shift C load Fc. At the time t2 when the shift C load Fc is sufficiently started up, the 2nd gear is disengaged, as shown in FIG. 14(D), the shift B load Fb is started up. Then, as shown in FIG. 14(E), the shift B stroke position rpSFTB starts moving to the neutral position and the 2nd gear is disengaged. At the time t3 when the shift B stroke position rpSFTB is dislocated from the meshing position, the rotational synchronization control phase is set.

In the rotational synchronization control phase, by the shift B load Fb and the shift C load Fc, the input speed Ni is synchronized with the speed Ni_1 corresponding to the 1st gear position from the speed Ni_2 corresponding to the 2nd gear position. In the rotational synchronization phase, from the time t4 to the time t5, the assist torque is distributed. With "shift C load" at the time t4 as starting point, as shown in FIG. 14(F), the shift C load is gradually decreased at a constant slope, and simultaneously, as shown in FIG. 14(D), the shift B load Fb is gradually increased. From the time t4 to the time t6, the adjustment under the feedback control for synchronizing the input shaft speed Ni with the speed Ni_1 corresponding to the 1st gear position is made mainly by the shift B load Fb. At the time t6 when the speed is synchronized, the gear engaging phase is set and as shown in FIG. 14(C), the shift A position rpSFTA moves to the 1st gear meshing position. At the time t7 when the shift A position rpSFTA moves to the 1st gear meshing position, the shifting end phase is set. In the shifting end phase, at the time t8 when the shift B load Fb is gradually decreased and becomes 0, the shift control is finished.

By use of such a constitution, the transmission output shaft torque is smoothly changed from the one corresponding to the 2nd gear to the one corresponding to the 3rd gear, from the one corresponding to the 3rd gear to the one corresponding to the 2nd gear, and from the one corresponding to the 2nd gear to the one corresponding to the 1st gear, and shifting having good operation performance (shift quality) can be realized.

Further, in the change from the pressing load (transfer torque) of the synchromesh corresponding to the 3rd gear to the one corresponding to the 2nd gear (from the time t4 to the time t5 during the rotational synchronization), with "shift C load" at the start time of the change of transfer torque from gear to gear as starting point, the shift C load Fc is gradually decreased at a constant slope on a feedforward basis. And the shift B load Fb is gradually increased, and the feedback control is performed by the shift B load Fb. Thus an occurrence of a shock due to the change of the pressing load of the synchromesh from gear to gear can be avoided, and shifting of good feeling can be realized.

Next, a fifth shift control example of the control apparatus of the embodiment will be explained by referring to FIG. 15. The fifth shift control example indicates the control contents at the time of down-shift from the 4th gear position to the 2nd gear position.

Figure 15:
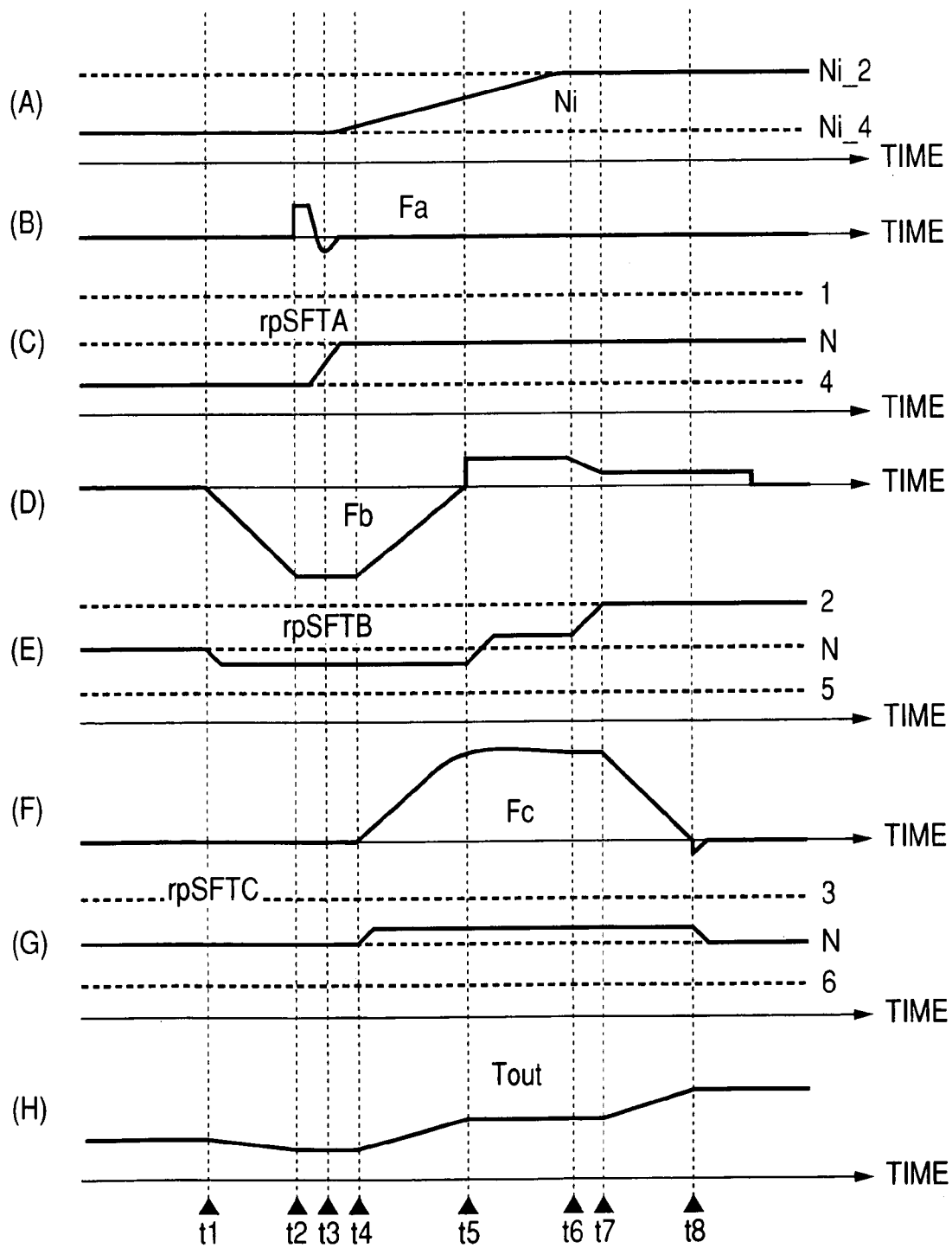
FIG. 15 is a time chart showing a fifth shift control example of the control apparatus of the automatic transmission of an embodiment of the present invention.

FIG. 15 is a time chart showing the fifth shift control example of the embodiment. In FIG. 15, the time of the axis of abscissa is the same as that shown in FIG. 11. Further, FIGS. 15(A) to 15(H) are the same as FIGS. 11(A) to 11(H).

At the time of down-shift from the 4th gear position to the 2nd gear position, the torque is transferred halfway using the 5th gear position and 3rd gear position. In short, at the time of 4-2 shifting, the torque is transferred in order of 4th gear, 5th gear, 3rd gear and 2nd gear. Further, in this example, in the same way as with FIG. 11, the function g2 at Step 906 shown in FIG. 9 is set to a one-to-one correspondence.

When the shifting is started at the time t1, in the disengaging control phase, as shown in FIG. 15(D), the power train control unit 100 starts up the shift B load Fb. At the time t2 when the shift B load Fb is sufficiently started up, the 4th gear is desengaged, as shown in FIG. 15(B), the shift A load Fa is started up. Then, as shown in FIG. 15(C), the shift A stroke position rpSFTA starts moving to the neutral position, and the 4th gear is disengaged. At the time t3 when the shift A stroke position rpSFTA is dislocated from the meshing position, the rotational synchronization control phase is set.

In the rotational synchronization control phase, by the shift A load Fa and the shift C load Fc, the input speed Ni is synchronized with the speed Ni_2 corresponding to the 2nd gear position from the speed Ni_4 corresponding to the 4th gear position. In the rotational synchronization phase, the assist torque is distributed. From the time t4 to the time t5, as shown in FIG. 15(D), with the shift B load at the time t4 as starting point, the shift B load Fb is gradually decreased at a constant slope, and simultaneously, as shown in FIG. 15(F), the shift C load Fc is gradually increased. Further, from the time t4 to the time t6, the adjustment under the feedback control for synchronizing the input shaft speed Ni with the speed Ni_2 corresponding to the 2nd gear position is made mainly by the shift C load Fc. At the time t6 when the speed is synchronized, the gear engaging phase is set and as shown in FIG. 15(E), the shift B position rpSFTB moves to the 2nd gear meshing position. At the time t7 when the shift B position rpSFTB moves to the 2nd gear meshing position, the shifting end phase is set. In the shifting end phase, as shown in FIG. 15(F), at the time t8 when the shift C load Fc is gradually decreased and becomes 0, the shift control is finished.

By use of such a constitution, the transmission output shaft torque is smoothly changed from the one corresponding to the 4th gear to the one corresponding to the 5th gear, from the one corresponding to the 5th gear to the one corresponding to the 3rd gear, and from the one corresponding to the 3rd gear to the one corresponding to the 2nd gear and shifting having good operation performance (shift quality) can be realized. Further, in the change from the pressing load (transfer torque) of the synchromesh corresponding to the 5th gear to the one corresponding to the 3rd gear (from the time t4 to the time t5 during the rotational synchronization), with "shift B load" at the start time of change of transfer torque from gear to gear as starting point, the shift B load Fb is gradeally decreased at a constant slope on a feedforward basis. And the shift C load Fc is gradually increased, and the feedback control is performed by the shift C load Fc. Thus an occurrence of a shock due to the change of the pressing load of the synchromesh from gear to gear can be avoided, and shifting of good feeling can be realized.

Next, a sixth shift control example of the embodiment will be explained by referring to FIG. 16. The sixth shift control example indicates the control contents at the time of shift-up from the 1st gear position to the 2nd gear position.

Figure 16:
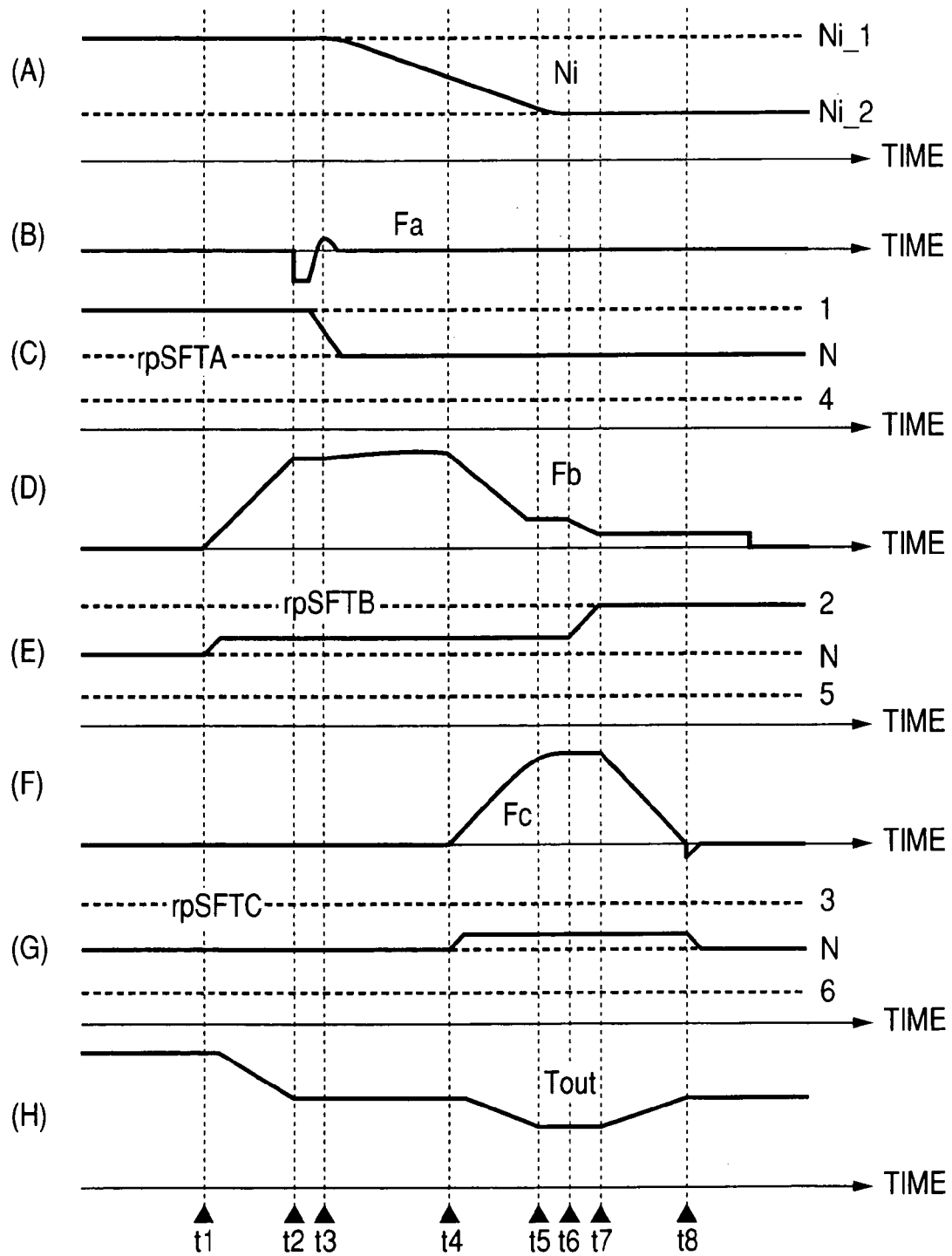
FIG. 16 is a time chart showing a sixth shift control example of the control apparatus of the automatic transmission of an embodiment of the present invention.

FIG. 16 is a time chart showing the sixth shift control example of the embodiment. In FIG. 16, the time of the axis of abscissa is the same as that shown in FIG. 11. Further, FIGS. 16(A) to 16(H) are the same as FIGS. 11(A) to 11(H).

Further, in this example, in the same way as with FIG. 11, the function g2 at Step 906 shown in FIG. 9 is set to a one-to-one correspondence. Further, the drawing shows a case that "3rd gear expected accumulated heat quantity Qstg3" obtained at Step 802 shown in FIG. 8 is increased, and "3rd gear distribution start time TMCHG3" obtained at Step 804 is prolonged.

The basic operation is the same as that shown in FIG. 11. Since "3rd gear distribution start time TMCHG3" is prolonged, the time from the time t3 to the time t4 is longer than that of the example shown in FIG. 11. When "3rd gear expected accumulated heat quantity Qstg3" is likely to increase, as shown in FIG. 16(F), the time for change to the 3rd position of halfway is retarded, and the heat quantity accumulated on the cone face between the third synchromesh 23 and the third drive gear 3 is decreased by the shift C load Fc.

Next, a deformation example of the shift control of the control apparatus of the automatic transmission of this embodiment will be explained by referring to FIGS. 17 and 18. The control contents shown in FIGS. 4 to 8 and FIG. 10 are the same. In the assist torque distribution process shown in FIG. 9, in place of Step 504 shown in FIG. 9, in this example, Step 1706 shown in FIG. 17 is performed.

Figure 17:
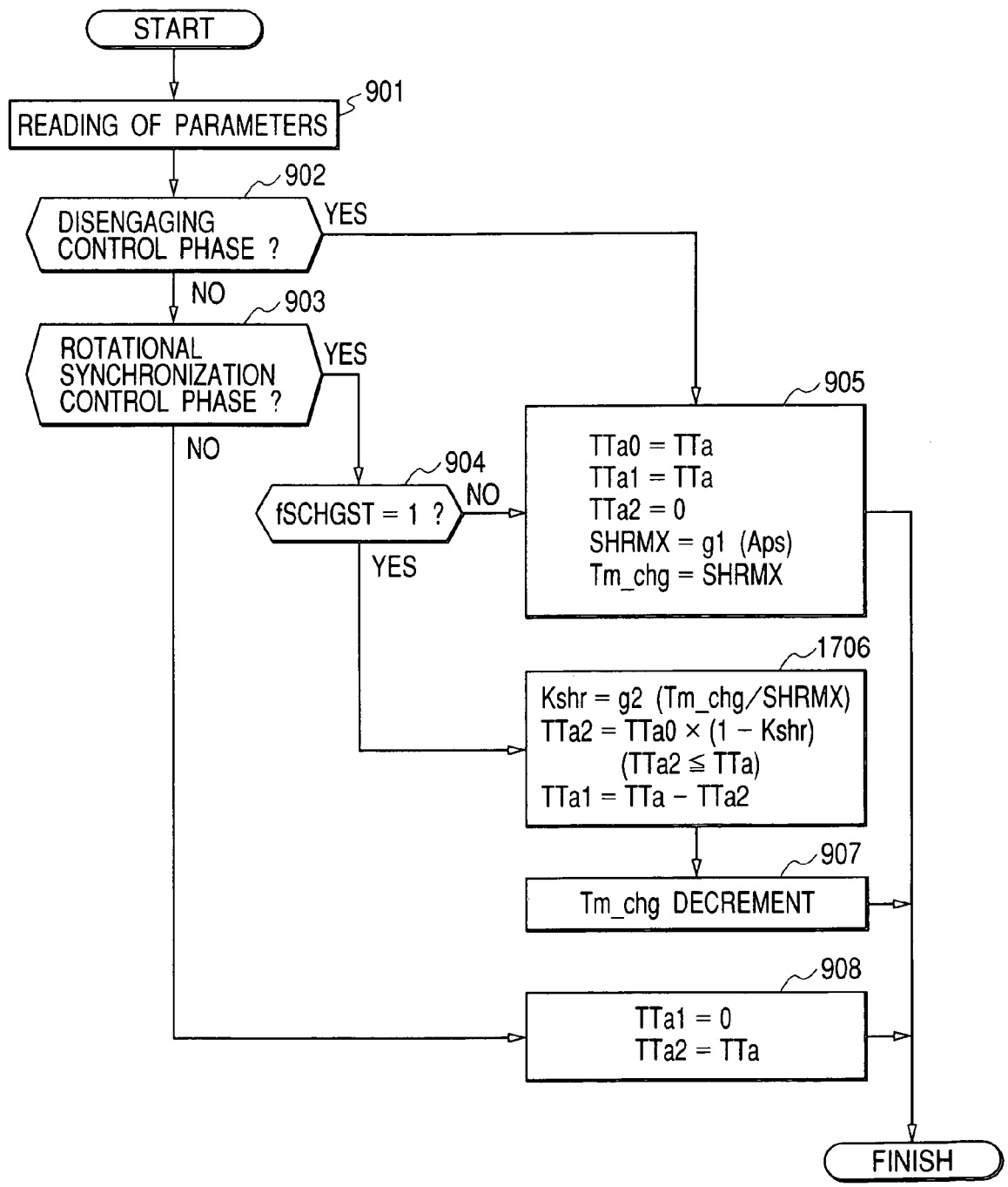
FIG. 17 is a flow chart showing the processing contents of a deformation example of the assist torque distribution process of the control apparatus of the automatic transmission of an embodiment of the present invention.

FIG. 17 is a flow chart showing the processing contents of the deformation example of the assist torque distribution process of the embodiment. FIG. 18 is a time chart showing the deformation example of the assist torque distribution process. Further, in FIG. 17, the processes of the same numerals as those shown in FIG. 9 indicate the same process contents. Further, in FIG. 18, the time of the axis of abscissa is the same as that shown in FIG. 11. Furthermore, FIGS. 18(A) to 18(H) are the same as FIGS. 11(A) to 11(H).

At Step 1706, the control unit 100 performs the control of the distribution of the target assist torque Tta to change the synchromesh from gear to gear. In the same way as with Step 906 shown in FIG. 9, the control unit 100 calculates the distribution rate Kshr as a function g2 of "distribution counter Tm_chg÷torque distribution time SHRMX". The second assist torque TTa2 is set to "TTa2=assist torque before distribution start TTa0×(1−distribution rate Kshr)", and is gradually changed up to the assist torque before distribution start TTa0 on a feedforward basis in correspondence with the change of the distribution rate Kshr. However, the upper limit of the second assist torque TTa2 is restricted by the target assist torque TTa. Further, the first assist torque TTa1 is set to "TTa2=target assist torque TTa−second assist torque TTa2", and the feedback control for the target assist torque shown in FIG. 7 is performed mainly by the first assist torque TTa1. Here, "distribution counter Tm_chg÷torque distribution time SHRMX" is a parameter gradually changing from 1 to 0, and the distribution rate Kshr is also a parameter gradually changing from 1 to 0. Namely, the relationship between the first assist torque TTa1 and the second assist torque TTa2 is opposite to that at Step 906 shown in FIG. 9.

Figure 18:
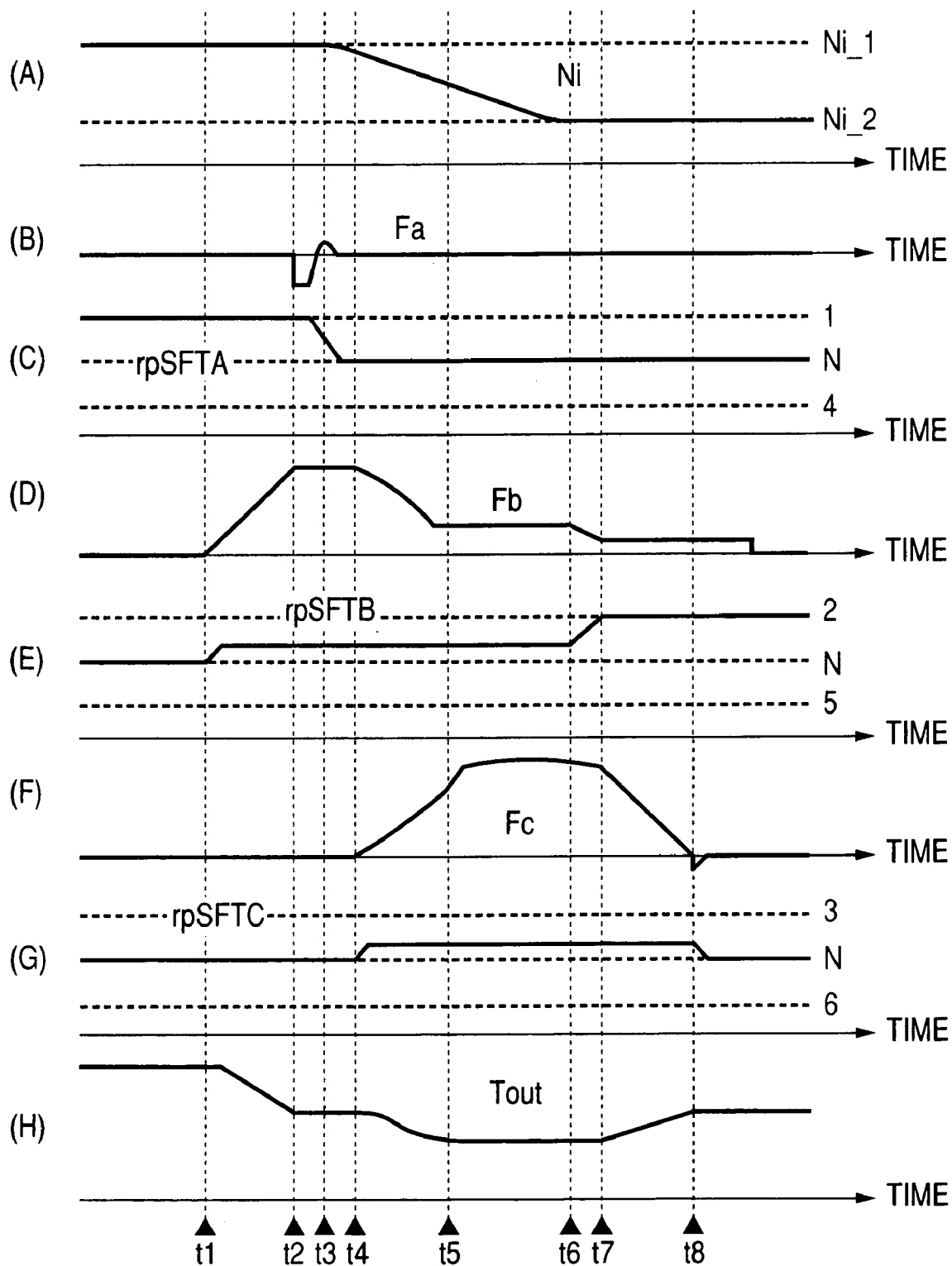
FIG. 18 is a time chart showing a deformation example of the assist torque distribution process of the control apparatus of the automatic transmission of an embodiment of the present invention.

FIG. 18 shows a time chart of a control example at the time of up-shift from the 1st gear position to the 2nd gear position by the assist torque distribution process shown in FIG. 17. In FIG. 18, the function g2 at Step 1706 shown in FIG. 17 is set so as to have many inflexion points instead of a one-to-one correspondence.

The basic operation is the same as that shown in FIG. 11. From the time t4 to the time t5, though the distribution of the assist torque is performed, as shown in FIG. 18(F), the shift C load Fc is gradually increased at a predetermined slope, and as shown in FIG. 18(D), the shift B load Fb is gradually decreased. Further, from the time t4 to the time t5, the adjustment under the feedback control for synchronizing the input shaft speed Ni with the speed Ni_2 corresponding to the 2nd gear position is made mainly by the shift B load Fb. Furthermore, from the time t5 to the time t6, the adjustment under the feedback control for synchronizing the input shaft speed Ni with the speed Ni_2 corresponding to the 2nd gear position is made mainly by the shift C load Fc.

By use of such a constitution, the transmission output shaft torque is smoothly changed from the one corresponding to the 1st gear to the one corresponding to the 2nd gear, from the one corresponding to the 2nd gear to the one corresponding to the 3rd gear, and from the one corresponding to the 3rd gear to the one corresponding to the 2nd gear, and shifting having good operation performance (shift quality) can be realized. Further, in the change of the pressing load of the synchromesh from the one corresponding to the 2nd gear to the one corresponding to the 3rd gear (from the time t4 to the time t5 during the rotational synchronization), the adjustment under the feedback control for synchronizing the input shaft speed Ni with the speed Ni_2 corresponding to the 2nd gear position is made mainly by the shift B load Fb. From the time t5 to the time t6, the adjustment under the feedback control for synchronizing the input shaft speed Ni with the speed Ni_2 corresponding to the 2nd gear position is made mainly by the shift C load Fc. Thus, an occurrence of a shock due to the change of the pressing load of the synchromesh from gear to gear can be avoided, and shifting of good feeling can be realized.

As explained above, according to this embodiment, depending on the gear ratio before shifting and the gear ratio after shifting, two synchromeshes can be selected so as to make the torque difference during shifting smaller, and the gear is shifted transferring the torque by the synchromesh during shifting, so-that the interruption of the drive torque during shifting can be avoided without impairing the shift quality by the torque difference.

Next, the constitution of the control apparatus of the automatic transmission of another embodiment of the present invention will be explained by referring to FIG. 19.

Figure 19:
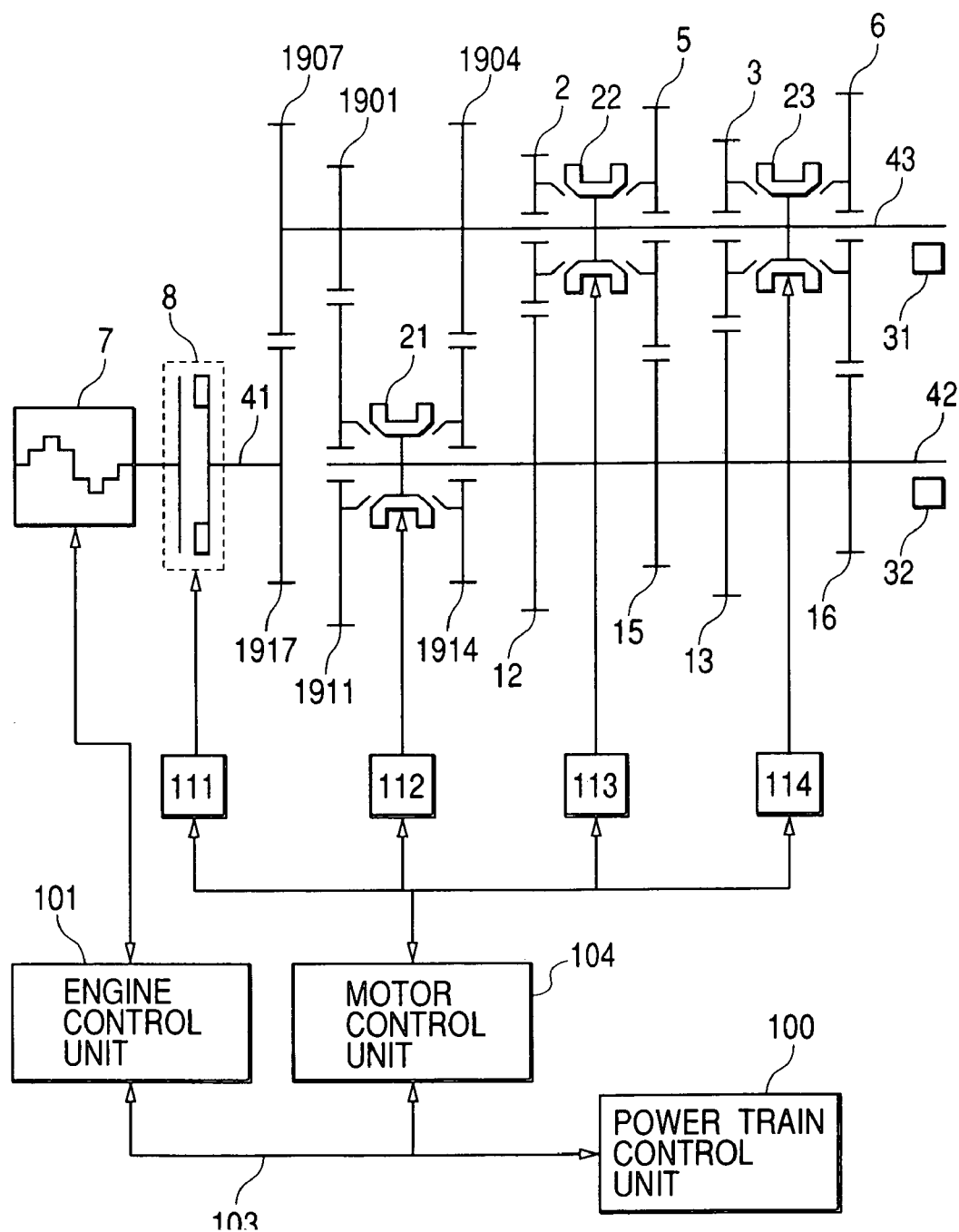
FIG. 19 is a skeleton diagram showing the constitution of the control apparatus of the automatic transmission of another embodiment of the present invention.

FIG. 19 is a skeleton diagram showing the constitution of the control apparatus of the automatic transmission of another embodiment. Further, the same numerals as those shown in FIG. 1 indicate the same parts.

In this embodiment, the difference from the constitution shown in FIG. 1 is that the constitution example of FIG. 1 is composed of the two shafts of the transmission input shaft 41 and the transmission output shaft 42, while this embodiment is composed of the three shafts that a counter shaft 43, which is a second input shaft rotating by the power of the engine 7, is added to the input shaft 41 and output shaft 42 of the transmission. Further, in the constitution example shown in FIG. 1, the first synchromesh 21 is arranged on the input shaft 41, while in this embodiment, it is arranged on the output shaft 42. Namely, the power of the engine 7 is transferred from an input drive gear 1917 to an input driven gear 1907, and transferred from the counter shaft 43 to the transmission output shaft 42 via a first drive gear 1901, the second drive gear 2, the third drive gear 3, a fourth drive gear 1904, the fifth drive gear 5, and the sixth drive gear 6, further a first driven gear 1911, the second driven gear 12, the third driven gear 13, a fourth driven gear 1914, the fifth driven gear 15, and the sixth driven gear 16.

As mentioned above, the present invention can be applied to various synchromesh type transmissions having: the input shaft rotating by torque from a drive power source, the output shaft for outputting a rotation torque to the drive shaft of the vehicle, and plural synchromeshes that constitute respective gear positions to transfer the rotation torque between the input shaft and output shaft.

The control contents in this embodiment are the same as those explained by referring to FIGS. 4 to 18.

As explained above, according to this embodiment, depending on the gear ratio before shifting and the gear ratio after shifting, two synchromeshes can be selected so as to make the torque difference during shifting smaller, and the gear is shifted transferring the torque by the synchromesh during shifting, so that the interruption of the drive torque during shifting can be avoided without impairing the shift quality by the torque difference.

EFFECTS OF THE INVENTION

According to the present invention, the torque difference in the drive torque during shifting can be reduced and the shift quality can be improved.

What is claimed is:

1. A control method for an automatic transmission having an input shaft rotating by torque from a drive power source, an output shaft for outputting a rotation torque to a drive shaft of a vehicle, plural idle gears for transferring the rotation torque between said input shaft and output shaft, and plural synchromeshes that constitute respective gear positions by engaging with each idle gear, furthermore said synchromeshes are equipped with; plural hubs rotating integrally with said input shaft or said output shaft; plural sleeves respectively provided on said hubs, rotatable integrally with said hubs and movable axially on said hubs; and plural rings respectively provided between said hubs and idle gears, and moving any of said sleeves toward the corresponding idle gear, any of said rings is pressed on the idle gear, the rotation torque from said input shaft is transferred to said output shaft through the ring and idle gear by the friction, and the sleeve can move to engage into the idle gear with synchronized speed, wherein the control of said automatic transmission comprising:

when shifting the gear position into a target gear position from a current gear position, using some gear position different from said current gear position as one distributing gear position, so that controlling the pressing load of a synchromesh of said one distributing gear position to transfer at least part of the rotation torque from the drive power source by the friction, thereby releasing at least part of the rotation torque transferred by a synchromesh of said current gear position;

moving the synchromesh of said current gear position to a disengaging position not meshed with said idle gear;

thereafter using another gear position different from said target gear position and said one distributing gear position as another distributing gear position, so that controlling the pressing load of the synchromesh of said another distributing gear to increases gradually the transfer torque by the friction, and simultaneously decreasing gradually the pressing load of the synchromesh of said one distributing gear position;

besides such a distribution of transfer torque, synchronizing the speed of said input shaft with the speed corresponding to said target gear position by controlling the speed of said input shaft, and then moving the synchromesh of the target gear position to the meshing position.

2. The control method for an automatic transmission according to claim 1, wherein:

the synchromesh of said one distributing gear position has a reduction ratio smaller than that of said current gear position, and said another distributing gear position used for said change of the transfer torque from gear to gear has a reduction ratio smaller than that of said target gear position.

3. The control method for an automatic transmission according to claim 1, when performing said change of the transfer torque from gear to gear, the pressing load of said one distributing gear position is decreased at a predetermined slope to decrease the transfer torque.

4. The control method for an automatic transmission according to claim 3, when performing said change of the transfer torque from gear to gear, the pressing load of said one distributing gear position is decreased at constant slope to decrease gradually the transfer torque.

5. The control method for an automatic transmission according to claim 1, when performing said change of the transfer torque from gear to gear, the pressing load of said one distributing gear position is decreased at a predetermined slope to decrease the transfer torque, and the pressing load of the synchromesh of said another distributing gear position used for engaging said target gear position is controlled so that the speed of said input shaft is synchronized with the speed corresponding to said target gear position.

6. The control method for an automatic transmission according to claim 1, when performing said change of the transfer torque from gear to gear, the pressing load of the synchromesh of said another distributing gear position used for engaging of said target gear position is increased at a predetermined slope to increase the transfer torque.

7. The control method for an automatic transmission according to claim 6, when performing said change of the transfer torque from gear to gear, the pressing load of the synchromesh of said another distributing gear position used for engaging of said target gear position is increased at a constant slope to increase gradually the transfer torque.

8. The control method for an automatic transmission according to claim 1,
when performing said change of the transfer torque from gear to gear, the pressing load of the synchromesh of said another distributing gear position used for engaging of said target gear position is increased at a predetermined slope to increase the transfer torque, and
the pressing load of the synchromesh of said one distributing gear position is controlled so that the speed of said input shaft is synchronized with the speed corresponding to said target gear position.

9. The control method for an automatic transmission according to claim 1, wherein the start timing when performing said change of the transfer torque from gear to gear is controlled according to at least parameter indicating a state of the frictional surface of the synchromesh.

10. The control method for an automatic transmission according to claim 9, wherein as a parameter indicating the state of the frictional surface of the synchromesh, the heat value of the frictional surface is used.

11. The control method for an automatic transmission according to claim 9, wherein as a parameter indicating the state of the frictional surface of the synchromesh, the temperature of the frictional surface is used.

12. The control method for an automatic transmission according to claim 9, wherein as a parameter indicating the state of the frictional surface of the synchromesh, the abrasion loss of the frictional surface is used.

13. A control apparatus for an automatic transmission having an input shaft rotating by torque from a drive power source, an output shaft for outputting a rotation torque to a drive shaft of a vehicle, plural idle gears for transferring the rotation torque between said input shaft and output shaft, and plural synchromeshes that constitute respective gear positions by engaging with each idle gear, furthermore said synchromeshes are equipped with; plural hubs rotating integrally with said input shaft or said output shaft; plural sleeves respectively provided on said hubs, rotatable integrally with said hubs and movable axially on said hubs; and plural rings respectively provided between said hubs and idle gears, and moving any of said sleeves toward the corresponding idle gear, any of said rings is pressed on the idle gear, the rotation torque from said input shaft is transferred to said output shaft through the ring and idle gear by the friction, and the sleeve can move to engage into the idle gear with synchronized speed, wherein said control apparatus has a control unit which performs the following contents:

when shifting the gear position into a target gear position from a current gear position, some gear position different from said current gear position is used as one distributing gear position, said control unit controls the pressing load of a synchromesh of said one distributing gear position to make at least part of the rotation torque from the drive power source transfer by the friction, thereby releases at least part of the rotation torque transferred by a synchromesh of said current gear position, and then moves the synchromesh of said curent gear position to a disengaging position not meshed with said idle gear, thereafter uses another gear position different from said target gear position and said one distributing gear position as another distributing gear position, so that controls the pressing load of the synchromesh of said another distributing gear to make the transfer torque increase gradually by the friction, and simultaneously makes the pressing load of the synchromesh of said one distributing gear position decrease gradually, besides such a distribution of transfer torque, makes the speed of said input shaft synchronize with the speed corresponding to said target gear position by controlling the speed of said input shaft, and then moves the synchromesh of the target gear position to the meshing position.

* * * * *